United States Patent
Mo et al.

(10) Patent No.: US 10,939,230 B2
(45) Date of Patent: Mar. 2, 2021

(54) INTERACTION INFORMATION OBTAINING METHOD, INTERACTION INFORMATION SETTING METHOD, USER TERMINAL, SYSTEM, AND STORAGE MEDIUM

(71) Applicant: Tencent Technology (Shenzhen) Company Limited, Shenzhen (CN)

(72) Inventors: Yang Mo, Shenzhen (CN); Yecheng Xian, Shenzhen (CN); Ling Liu, Shenzhen (CN); Yu Zhang, Shenzhen (CN); Ran Jing, Shenzhen (CN); Liqiang Liu, Shenzhen (CN); Huayu Sun, Shenzhen (CN); Zhi Yuan, Shenzhen (CN); Bosheng Lei, Shenzhen (CN); Fang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/425,749

(22) Filed: May 29, 2019

(65) Prior Publication Data
US 2019/0281411 A1    Sep. 12, 2019

Related U.S. Application Data

(63) Continuation of application No. PCT/CN2018/072229, filed on Jan. 11, 2018.

(30) Foreign Application Priority Data

Jan. 12, 2017    (CN) .......................... 201710021988.3

(51) Int. Cl.
*H04W 4/021*    (2018.01)
*H04W 4/029*    (2018.01)
(Continued)

(52) U.S. Cl.
CPC ............ *H04W 4/021* (2013.01); *G06F 16/29* (2019.01); *H04W 4/02* (2013.01); *H04W 4/025* (2013.01); *H04W 4/029* (2018.02)

(58) Field of Classification Search
CPC ....... H04W 4/021; H04W 4/02; H04W 4/029; H04W 4/025; H04W 4/023; G06F 16/29;
(Continued)

(56) References Cited

U.S. PATENT DOCUMENTS 9,410,815 B1 *   8/2016   Hirano ............... G01C 21/3407
9,476,731 B1    10/2016   Wilson
(Continued)

FOREIGN PATENT DOCUMENTS

CN    102708214 A    10/2012
CN    104135716 A    11/2014
(Continued)

OTHER PUBLICATIONS

Tencent Technology, ISRWO, PCT/CN2018/072229, Apr. 19, 2018, 6 pgs.
(Continued)

*Primary Examiner* — Peter P Chau
(74) *Attorney, Agent, or Firm* — Morgan, Lewis & Bockius LLP

(57) ABSTRACT

Embodiments of this application disclose an interaction information obtaining method performed at a target user terminal. After detecting, on a virtual map preset in an interaction application, a trigger operation performed on a target POI identifier, the target user terminal obtains first location information of the target user terminal by using the virtual map and second location information corresponding to the target POI identifier on the virtual map. The target user terminal detects a distance difference between the first location information and the second location information.
(Continued)

When the distance difference satisfies a preset distance range, the target user terminal sends, to an interaction server, an interaction information request carrying the target POI identifier and receives interaction information corresponding to the target POI identifier from the interaction server and then displays the interaction information on the virtual map.

15 Claims, 14 Drawing Sheets

(51) Int. Cl.
*G06F 16/29* (2019.01)
*H04W 4/02* (2018.01)

(58) Field of Classification Search
CPC ............ G06F 3/04883; G06F 1/1686; G06F 3/04845; G01C 21/3673; G01C 21/00; H04L 67/38; H04L 67/18; H04L 51/20; H04L 51/32
See application file for complete search history.

(56) References Cited

U.S. PATENT DOCUMENTS

2009/0319178 A1* 12/2009 Khosravy ............... H04L 67/18
701/408
2011/0313657 A1* 12/2011 Myllymaki ........ G01C 21/3679
701/438
2014/0274145 A1* 9/2014 Cronin .................. H04W 4/021
455/456.3

FOREIGN PATENT DOCUMENTS

| CN | 104598504 A | 5/2015 |
| CN | 104834727 A | 8/2015 |
| CN | 106210033 A | 12/2016 |
| KR | 20150099939 A | 9/2015 |

OTHER PUBLICATIONS

Tencent Technology, IPRP, PCT/CN2018/072229, Jul. 16, 2019, 5 pgs.

* cited by examiner

INTERACTION INFORMATION OBTAINING METHOD, INTERACTION INFORMATION SETTING METHOD, USER TERMINAL, SYSTEM, AND STORAGE MEDIUM

CROSS-REFERENCE TO RELATED APPLICATIONS

This application is a continuation application of PCT/CN2018/072229, entitled "INTERACTION INFORMATION OBTAINING METHOD, INTERACTION INFORMATION SETTING METHOD, USER TERMINAL, SYSTEM, AND STORAGE MEDIUM" filed on Jan. 11, 2018, which claims priority to Chinese Patent Application No. 201710021988.3, filed with the Chinese Patent Office on Jan. 12, 2017 and entitled "INTERACTION INFORMATION OBTAINING METHOD, INTERACTION INFORMATION SETTING METHOD, USER TERMINAL, AND SYSTEM", all of which are incorporated by reference in their entirety.

FIELD OF THE TECHNOLOGY

This application relates to the field of Internet technologies, and in particular, to an interaction information obtaining method, an interaction information setting method, a user terminal, a system, and a storage medium.

BACKGROUND OF THE DISCLOSURE

As Internet technologies are constantly developed and improved, user terminals such as mobile phones and tablet computers have become an indispensable part of people's life. People can not only communicate, but also can transmit a file, take a photo, play a game, or the like with these terminals.

As technologies are developed, some geographical locations, for example, a location of an outdoor activity (for example, a restaurant, a hotel, or a road toll station) near a current location and information related to the geographical locations (for example, a name of a restaurant and a location of a hotel) can be obtained based on some terminal applications on a user terminal. The foregoing information is collectively referred to as points of information (Point Of Information, POI), and the POI may include information such as a name, a type, and a longitude and a latitude.

SUMMARY

A first embodiment of this application provides an interaction information obtaining method performed at a target user terminal having one or more processors and memory storing a plurality of operations to be executed by the one or more processors, the method comprising:

detecting, by the target user terminal, on a virtual map preset in an interaction application, a trigger operation performed on a target point of information POI identifier;

obtaining, by the target user terminal, first location information of the target user terminal by using the virtual map;

obtaining, on the virtual map by the target user terminal, second location information corresponding to the target POI identifier, and detecting a distance difference between the first location information and the second location information;

in accordance with a determination that the distance difference satisfies a preset distance range, sending, by the target user terminal to an interaction server, an interaction information request carrying the target POI identifier, wherein the interaction server, in response to the interaction information request, obtains interaction information corresponding to the target POI identifier and sends the interaction information to the target user terminal; and receiving, by the target user terminal, the interaction information sent by the interaction server, and displaying the interaction information on the virtual map.

A second embodiment of this application provides a target user terminal having one or more processors, memory, and a plurality of machine readable instructions stored in the memory. The plurality of machine readable instructions, when executed by the one or more processors, cause the target user terminal to perform the aforementioned interaction information obtaining method.

A third embodiment of this application provides a non-transitory computer readable storage medium storing a plurality of machine readable instructions in connection with a target user terminal having one or more processors. The plurality of machine readable instructions, when executed by the one or more processors, cause the target user terminal to perform the aforementioned interaction information obtaining method.

This application further provides a non-volatile computer-readable storage medium, storing a computer-readable instruction, and enabling at least one processor to perform the foregoing method.

BRIEF DESCRIPTION OF THE DRAWINGS

To describe the technical solutions in the embodiments of this application or in the existing technology more clearly, the following briefly introduces the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
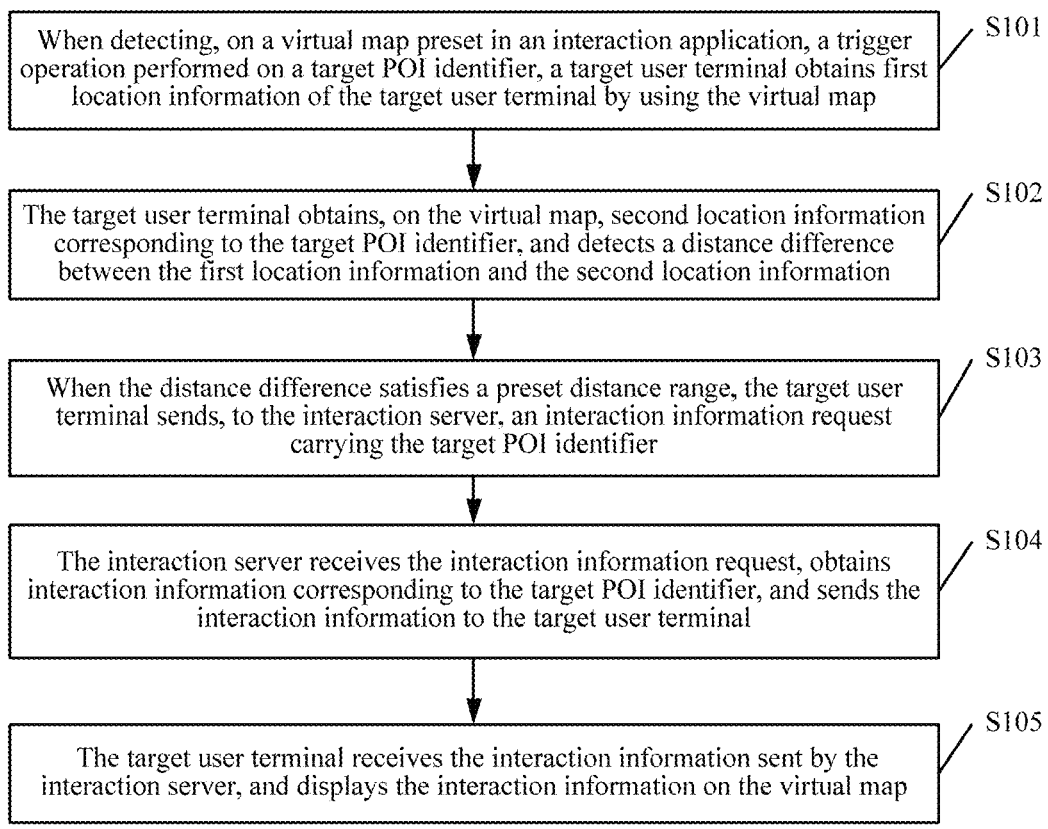
FIG. 1 is a schematic flowchart of an interaction information obtaining method according to an embodiment of this application.

The following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

In an embodiment of this application, a POI is usually recorded in a navigation map and is used to mark a characteristic of a current road, and the POI does not have many descriptions and needs to be searched for and viewed by using another terminal application. This reduces POI-related information viewing efficiency, and POI information is viewed in an excessively monotonous manner, affecting interactivity with a user terminal.

An interaction information obtaining method provided in the embodiments of this application may be applied to a scenario of obtaining POI-related information or a scenario of interacting between user terminals based on a POI, for example, the following scenario: when detecting, on a virtual map, a trigger operation performed on a target POI identifier, a target user terminal obtains current first location information based on an interaction application; the target user terminal obtains second location information corresponding to the target POI identifier, and detects a distance difference between the first location information and the second location information; when the distance difference satisfies a preset distance range, the target user terminal sends, to the interaction server, an interaction information request carrying the target POI identifier; the interaction server receives the interaction information request sent by the target user terminal, obtains the interaction information corresponding to the target POI identifier, and sends the interaction information to the target user terminal; and the target user terminal receives the interaction information sent by the interaction server, and outputs and displays the interaction information. This implements a process of obtaining POI-related interaction information based on location information, and improves efficiency of viewing POI-related information. In addition, the interaction information may be self-defined and provided by a source user terminal, POI information is viewed in more diversified manners and content displayed by a POI is enriched, and interactivity with a user terminal is improved.

Both the target user terminal and the source user terminal in the embodiments of this application may be terminal devices having a positioning function such as tablet computers, smartphones, palmtop computers, and mobile Internet devices (MID). It may be understood that, the target user terminal and the source user terminal may be a same user terminal, where the expressions of "target" and "source" are only used to distinguish between a receive end of the interaction information and a transmit end of the interaction information. The interaction server may be specifically a background service device of the interaction application, and the interaction application may be specifically an instant messaging application. The virtual map is displayed on the foregoing terminal devices, and may include at least one virtual map of an electronic map, a digital map, a satellite map, and a panorama map. The virtual map may further be in a preset form, and the virtual map may be packaged by using a graph or an image, so that the virtual map is in the preset form. Specifically, the virtual map may be packaged by using a graph or an image, so that the virtual map is in an animation and/or game form. For example, an animation and/or game element is added to the virtual map. In this way, a Tencent edifice displayed on the virtual map may be a housing, and a penguin icon is marked on the housing to more vividly indicate the Tencent edifice. Still further, the virtual map is a functional module of the interaction application. Certainly, the virtual map may alternatively be independent from the interaction application. This is not limited in this application.

The following describes an interaction information obtaining method and an interaction information setting method in embodiments of this application in detail with reference to FIG. 1 to FIG. 11.

FIG. 1 is a schematic flowchart of an interaction information obtaining method according to an embodiment of this application. As shown in FIG. 1, in this embodiment of this application, a specific procedure of the interaction information obtaining method is described on both a target user terminal side and an interaction server side. The method includes the following steps S101 to S105.

S101: When detecting, on a virtual map preset in an interaction application, a trigger operation performed on a target POI identifier, a target user terminal obtains first location information of the target user terminal by using the virtual map.

Specifically, when detecting, on the virtual map, that the trigger operation is performed on the target POI identifier, for example, a tap operation is performed on the target POI identifier, the target user terminal may obtain the current first location information of the target user terminal based on the interaction application. It may be understood that, the virtual map is a map generated by the interaction server by using a plurality of POI identifiers and map data that are obtained in advance. The interaction server may send the virtual map to the target user terminal for display. The virtual map may include the plurality of POI identifiers, and the target user terminal may detect, from the plurality of POI identifiers of the virtual map, the target POI identifier on which the trigger operation is performed. The POI identifier may be specifically a symbol marking a POI on the virtual map. The first location information is used to indicate actual location information of the target user terminal when it is detected that the trigger operation is performed on the target POI identifier. In some examples, the first location information may be marked on the virtual map.

S102: The target user terminal obtains, on the virtual map, second location information corresponding to the target POI identifier, and detects a distance difference between the first location information and the second location information.

Specifically, the target user terminal may obtain the second location information corresponding to the target POI identifier. The second location information is used to indicate actual location information of a target POI indicated by the target POI identifier. In some examples, the second location information may be marked on the virtual map. The target user terminal may detect the actual distance difference between the first location information and the second location information based on a positioning function of the target user terminal.

S103: When the distance difference satisfies a preset distance range, the target user terminal sends, to the interaction server, an interaction information request carrying the target POI identifier.

Specifically, when detecting that the distance difference between the first location information and the second location information satisfies the preset distance range, the target user terminal may send, to the interaction server, the interaction information request carrying the target POI identifier. In some examples, when the distance difference falls within the preset distance range, for example, when the preset distance range is 0 meter to 50 meters and the distance difference is 45 meters, it is determined that the distance difference satisfies the preset distance range.

S104: The interaction server receives the interaction information request sent by the target user terminal, obtains interaction information corresponding to the target POI identifier, and sends the interaction information to the target user terminal.

Specifically, the interaction server receives the interaction information request sent by the target user terminal, and may obtain, from a database corresponding to the plurality of POI identifiers, the interaction information corresponding to the target POI identifier, and send the interaction information to the target user terminal.

S105: The target user terminal receives the interaction information sent by the interaction server, and displays the interaction information on the virtual map.

Specifically, the target user terminal receives the interaction information that corresponds to the target POI identifier and that is sent by the interaction server, and outputs and displays the interaction information. In some examples, the interaction information may be encapsulated in an interaction label, to improve interactivity with a user terminal. The interaction label may be specifically a trigger button for obtaining the interaction information, and the interaction label may be displayed in a form such as a treasure box or a red envelope. An output and display manner may be specifically displaying the interaction label based on a camera of the target user terminal, to obtain a manner of outputting and displaying the interaction information. Alternatively, at least one interaction label may be used for encapsulation, and the manner of outputting and displaying the interaction information may be randomly obtained.

In this embodiment of this application, when the operation is triggered on the target POI identifier on the virtual map, the distance difference between the current first location information of the target user terminal and the second location information corresponding to the target POI identifier is obtained on the virtual map, and when the distance difference satisfies the preset distance range, the interaction information corresponding to the target POI identifier may further be obtained from the interaction server, and is outputted and displayed. This implements a process of obtaining POI-related interaction information based on location information, and improves efficiency of viewing POI-related information. In addition, the interaction information may be self-defined and provided by a source user terminal, POI information is viewed in more diversified manners and content displayed by a POI is enriched, and interactivity with a user terminal is improved.

Herein, the interaction information may be some information set by the source user terminal and displayed by the target user terminal, for example, discount information such as a coupon, a red envelop, or a game coin of a business that is set by the business in an interaction application running on a source user terminal, and multimedia information such as promoted pictures of the business, to interact with a customer of the business. An interaction application, for example, QQ on a mobile phone, runs on both the source user terminal used by the business and the target user terminal used by a customer for interaction.

Figure 2:
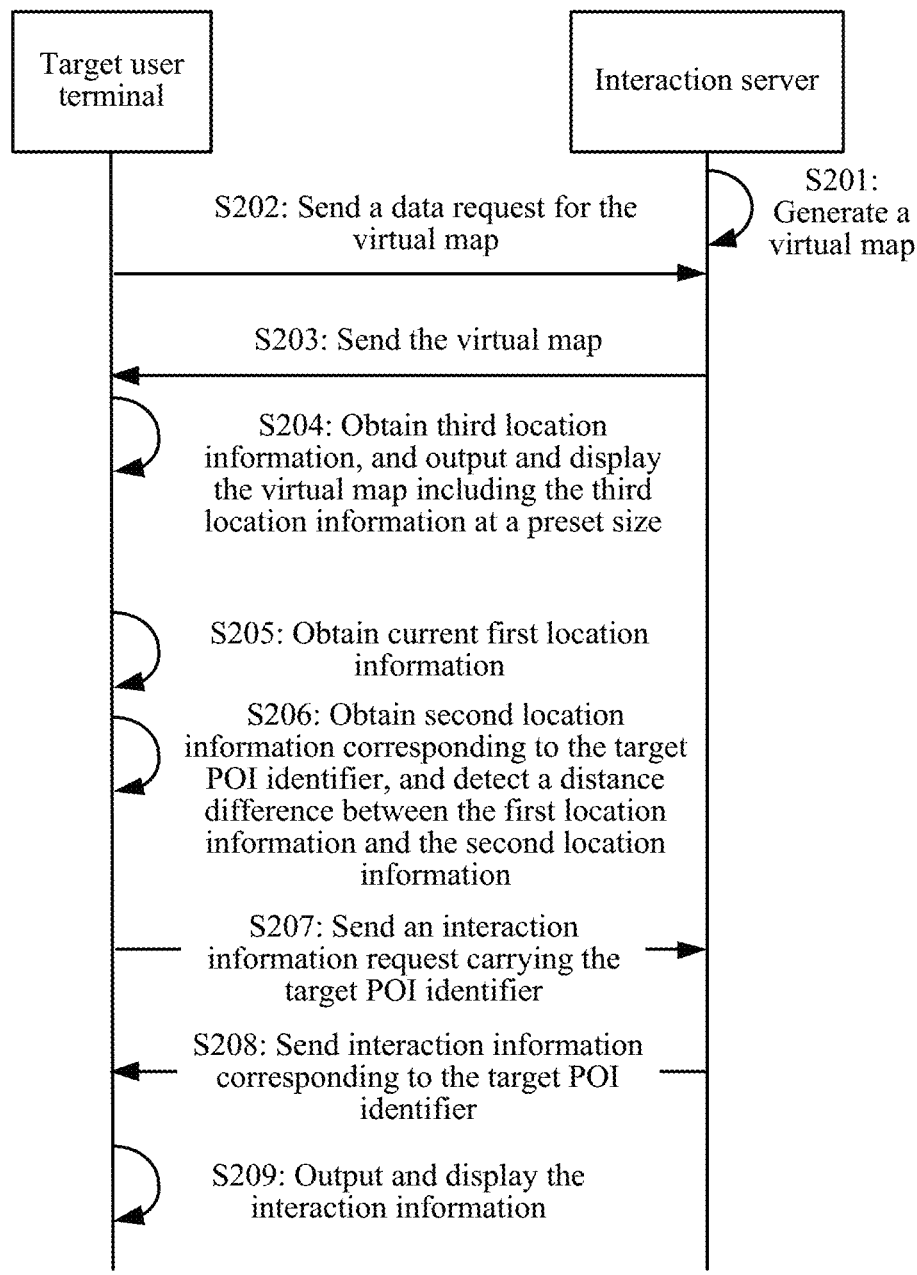
FIG. 2 is a time-sequence flowchart of an interaction information obtaining method according to an embodiment of this application.

FIG. 2 is a time-sequence flowchart of an interaction information obtaining method according to an embodiment of this application. As shown in FIG. 2, in this embodiment of this application, a specific procedure of the interaction information obtaining method is described on both a target user terminal side and an interaction server side. It should be noted that the method in this embodiment of this application may be specifically applied to a scenario in which a business adds interaction information to a POI of the business. The method includes the following steps S201 to S209.

S201: An interaction server generates a virtual map by using a plurality of POI identifiers and map data that are obtained in advance.

Specifically, the interaction server may generate the virtual map by using the plurality of POI identifiers and the map data that are obtained in advance. It may be understood that the map data may include specific distribution data about a road, a greenbelt, a lake, and the like. The plurality of POI identifiers may include distribution identifiers of buildings such as a hotel, a residence, a restaurant, and a toll station. The POI identifiers may be specifically symbols marking POIs on the virtual map. The interaction server performs rendering processing on the plurality of POI identifiers and the map data in a preset rendering manner, to generate the virtual map. In addition, on the virtual map, different interaction information may be set in a corresponding database of the POI identifiers based on requirements of different businesses. In some examples, the interaction information may include discount information, multimedia information, and the like provided by the business.

S202: When detecting that an interaction application is triggered to start, a target user terminal sends a data request for the virtual map to the interaction server.

Specifically, when detecting that the interaction application on the target user terminal is triggered to start, for example, a tap operation is performed on an application icon of the interaction application or a slide operation in a fixed direction is detected on an interface of the interaction application, the target user terminal may send the data request for the virtual map to the interaction server.

S203: The interaction server receives the data request sent by the target user terminal, and sends the virtual map to the target user terminal.

S204: The target user terminal receives the virtual map sent by the interaction server, obtains third location information, and outputs and displays the virtual map including the third location information at a preset size.

Specifically, the target user terminal receives the virtual map sent by the interaction server. In some examples, the target user terminal may locally store the virtual map, and when starting the interaction application the next time, may not need to repeatedly obtain the virtual map from the interaction server.

The target user terminal may obtain the third location information, where the third location information is used to indicate actual location information of the target user terminal when the interaction application is triggered to start. In some examples, the third location information may be marked on the virtual map. The target user terminal may output and display the virtual map at a preset size by using the third location information as a center. The preset size may be specifically set based on an empirical value of developing personnel. For example, currently, the target user terminal displays a 200 meters*200 meters virtual map by using the third location information as the center. Certainly, that the third location information is used as the center is only an example for description. Alternatively, the virtual map that uses a third location as a first viewing angle and that includes the left, the right, and the front may be further outputted and displayed at a preset size. These all fall within the protection scope of this embodiment of this application.

Figure 3:
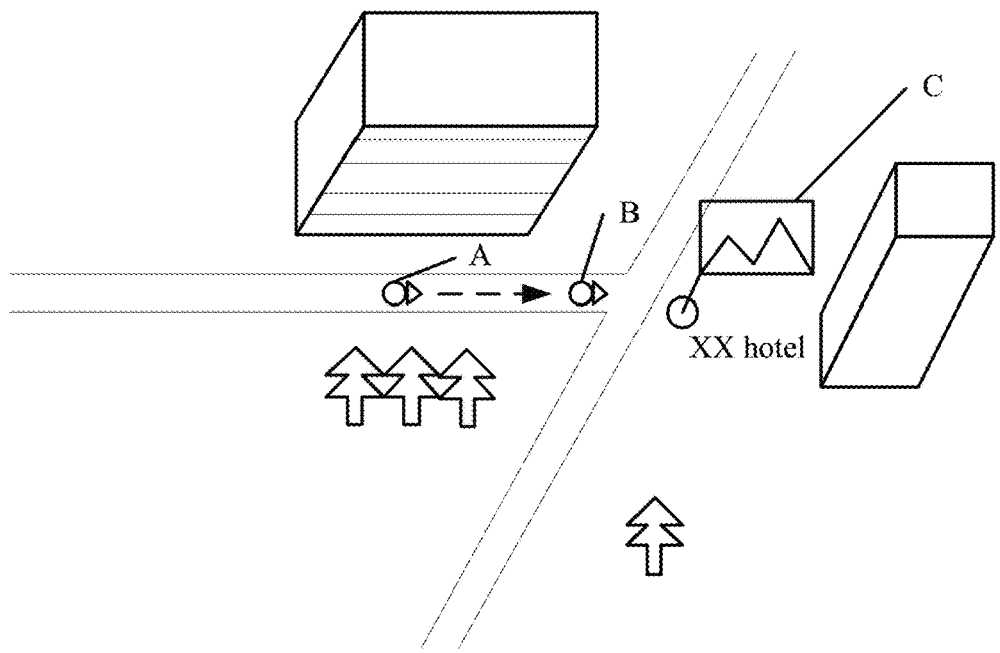
FIG. 3 is a schematic diagram of an example of obtaining interaction information according to an embodiment of this application.

It should be noted that the virtual map may include a virtual map in a first display dimension and a virtual map in a second display dimension. The first display dimension may be a three-dimensional display dimension, and the second display dimension may be a two-dimensional display dimension. The virtual map in the first display dimension may be specifically used to display a current location of the target user terminal, and the virtual map in the second display dimension may be specifically used to search for a POI identifier having a relatively long distance or the like. Further, the target user terminal obtains third location information, and outputs and displays the virtual map including the third location information in the first display dimension at a first preset size. Referring to FIG. 3, the target user terminal may display the virtual map in the three-dimensional display dimension, where a point A indicates the third location information, that is, actual location information of the target user terminal when the interaction application is triggered to start.

S205: When detecting, on the virtual map preset in the interaction application, a trigger operation performed on a target point of information POI identifier, the target user terminal obtains first location information of the target user terminal by using the virtual map.

Specifically, when detecting, on the virtual map, that the trigger operation is performed on the target POI identifier, for example, a tap operation is performed on the target POI identifier, the target user terminal may obtain the current first location information of the target user terminal based on the interaction application. It may be understood that, the virtual map is a map generated by the interaction server by using a plurality of POI identifiers and map data that are obtained in advance. The interaction server may send the virtual map to the target user terminal for display. The virtual map may include the plurality of POI identifiers, and the target user terminal may detect, from the plurality of POI identifiers of the virtual map, the target POI identifier on which the trigger operation is performed. The POI identifier may be specifically a symbol marking a POI on the virtual map. The first location information is used to indicate actual location information of the target user terminal when it is detected that the trigger operation is performed on the target POI identifier. In some examples, the first location information may be marked on the virtual map. Referring to FIG. 3, because there is a time difference between detection of the trigger operation on the target POI identifier and triggering the interaction application to start, a location of the target user terminal may change from the third location information to the first location information. A point B in FIG. 3 indicates the first location information, and a movement identifier (a dashed line with an arrow pointing from the point A to the point B shown in FIG. 3) between the point A and the point B is used to describe that the target user terminal already moves from the original point A to the point B. In addition, a target POI identifier of an XX hotel is displayed at a point C. When it is detected that a tap operation is performed on the target POI identifier, the current first location information, that is, the point B may be obtained.

S206: The target user terminal obtains, on the virtual map, second location information corresponding to the target POI identifier, and detects a distance difference between the first location information and the second location information.

Specifically, the target user terminal may obtain the second location information corresponding to the target POI identifier. The second location information is used to indicate actual location information of a target POI indicated by the target POI identifier. In some examples, the second location information may be marked on the virtual map. The target user terminal may detect the actual distance difference between the first location information and the second location information based on a positioning function of the target user terminal. Referring to FIG. 3, the point C in FIG. 3 indicates the second location information, and the point C specifically indicates the second location information of the target POI identifier of the XX hotel.

S207: When the distance difference satisfies a preset distance range, the target user terminal sends, to the interaction server, an interaction information request carrying the target POI identifier.

Specifically, when detecting that the distance difference between the first location information and the second location information satisfies the preset distance range, the target user terminal may send, to the interaction server, the interaction information request carrying the target POI identifier. In some examples, when the distance difference falls within the preset distance range, where based on a distance shown in FIG. 3, it is assumed that the preset distance range is 0 meter to 50 meters and the distance difference between the point B and the point C is 45 meters, it is determined that the distance difference satisfies the preset distance range.

S208: The interaction server receives the interaction information request sent by the target user terminal, obtains interaction information corresponding to the target POI identifier, and sends the interaction information to the target user terminal.

Specifically, the interaction server receives the interaction information request sent by the target user terminal, and may obtain, from a database corresponding to the plurality of POI identifiers, the interaction information corresponding to the target POI identifier, and send the interaction information to the target user terminal.

S209: The target user terminal receives the interaction information sent by the interaction server, and displays the interaction information on the virtual map.

Specifically, the target user terminal receives the interaction information that corresponds to the target POI identifier and that is sent by the interaction server, and outputs and displays the interaction information. In some examples, the interaction information may be encapsulated in an interaction label, to improve interactivity with a user terminal. The interaction label may be specifically a trigger button for obtaining the interaction information, and the interaction label may be displayed in a form such as a treasure box or a red envelope. An output and display manner may be specifically displaying the interaction label based on a camera of the target user terminal, to obtain a manner of outputting and displaying the interaction information. Alternatively, at least one interaction label may be used for encapsulation, and the manner of outputting and displaying the interaction information may be randomly obtained.

Figure 4:
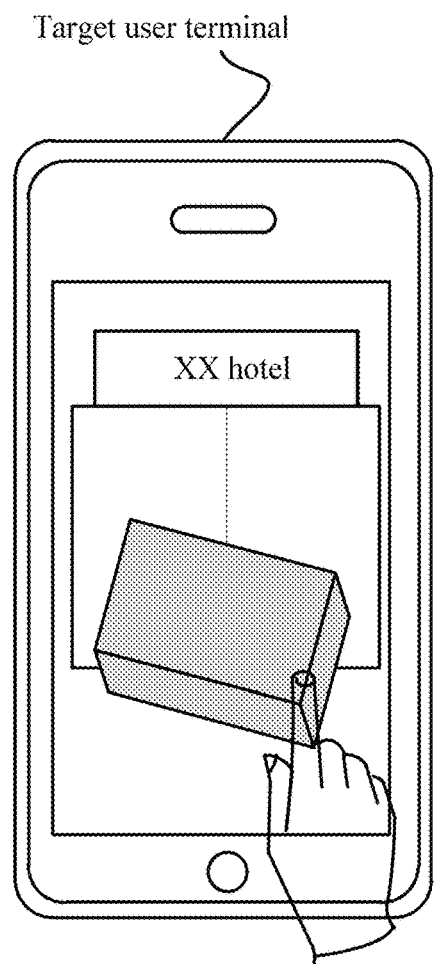
FIG. 4 is a schematic diagram of another example of obtaining interaction information according to an embodiment of this application.

Further, specifically, when the camera is used, the camera of the target user terminal may be started to obtain a current shot picture, and the interaction label is displayed in the current shot picture. It may be understood that, the current shot picture may move as the camera moves, and the interaction label may be provided at a fixed location in the current shot picture. In some examples, a gyroscope of the target user terminal may be used to fix the interaction label, so that the interaction label is fixed at the location and does not move as the shot picture of the camera moves. Referring to FIG. 4, the target user terminal may start the camera, the current shot picture of the camera is a gate of an XX hotel, and the interaction label, for example, a treasure box, encapsulated with the interaction information may be displayed in the current shot picture. A box shown in FIG. 4 indicates the interaction label. When detecting that the trigger operation is performed on the interaction label, for example, a tap operation is performed on the interaction label in the current shot picture, the target user terminal may output and display the interaction information and store the interaction information.

Figure 5:
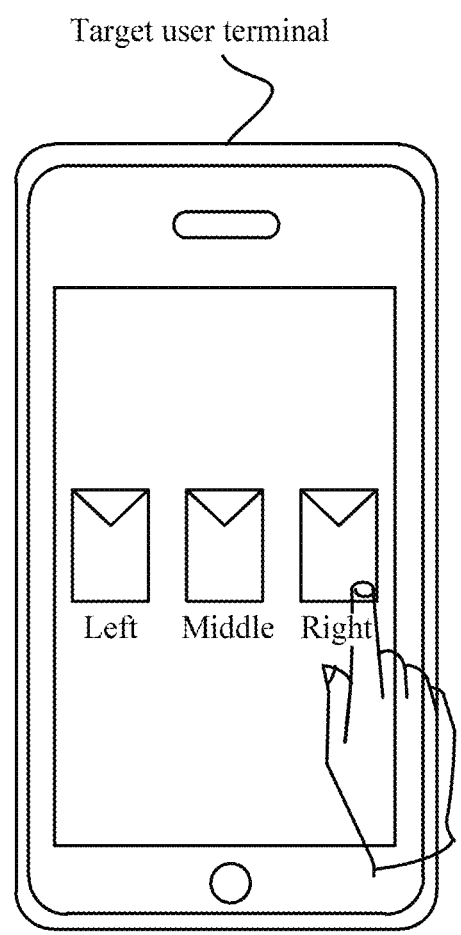
FIG. 5 is a schematic diagram of still another example of obtaining interaction information according to an embodiment of this application.

Specifically, when at least one interaction label is used, the target user terminal may encapsulate the interaction information based on a preset encapsulation rule, and generate the at least one interaction label after encapsulation. The preset encapsulation rule may specifically define a quantity of encapsulated interaction labels, a location of a target interaction label in which the interaction information is stored, and the like. Referring to FIG. 5, assuming that the preset encapsulation rule is generating left, middle, and right interaction labels after encapsulation, for example, three red envelopes, and the interaction information, for example, a coupon, is stored in the "right" interaction label, the target user terminal may display the three interaction labels. As shown in FIG. 5, a red envelope is an interaction label, and the three interaction labels are marked as "left", "middle", and "right". When detecting, from the at least one interaction label, that the trigger operation is performed on the target interaction label including the interaction information, for example, in FIG. 5, if a tap operation is performed on the "right" target interaction label, the target user terminal may output and display the interaction information and store the interaction information.

It should be noted that the target user terminal may obtain and store a plurality of pieces of interaction information in the same manner. Picture information in multimedia information is used as an example, and the picture information may be divided into a plurality of pieces of picture fragment information. When different pieces of picture fragment information (for example, spokesman pictures of stars) or a preset quantity of pieces of picture fragment information are collected, an exchange request is sent to the interaction server. After obtaining the exchange request, if the different pieces of picture fragment information or the quantity of pieces of picture fragment information stored by the target user terminal satisfy a preset exchange condition, the interaction server may deliver a corresponding gift, for example, an entrance ticket for photographing with a star or an electronic voucher such as a gift exchange voucher, to the target user terminal.

In this embodiment of this application, when the operation is triggered on the target POI identifier on the virtual map, the distance difference between the current first location information of the target user terminal and the second location information corresponding to the target POI identifier is obtained on the virtual map, and when the distance difference satisfies the preset distance range, the interaction information corresponding to the target POI identifier may further be obtained from the interaction server, and is outputted and displayed. This implements a process of obtaining POI-related interaction information based on location information, and improves efficiency of viewing POI-related information. In addition, the interaction information may be self-defined and provided by a source user terminal, POI information is viewed in more diversified manners and content displayed by a POI is enriched, and interactivity with a user terminal is improved. Requirements of different using environments can be satisfied, and using by the user can be facilitated by using the virtual maps in different dimensions. The interaction information is encapsulated in the interaction label, so that interactivity with the user terminal can be further improved.

Figure 6:
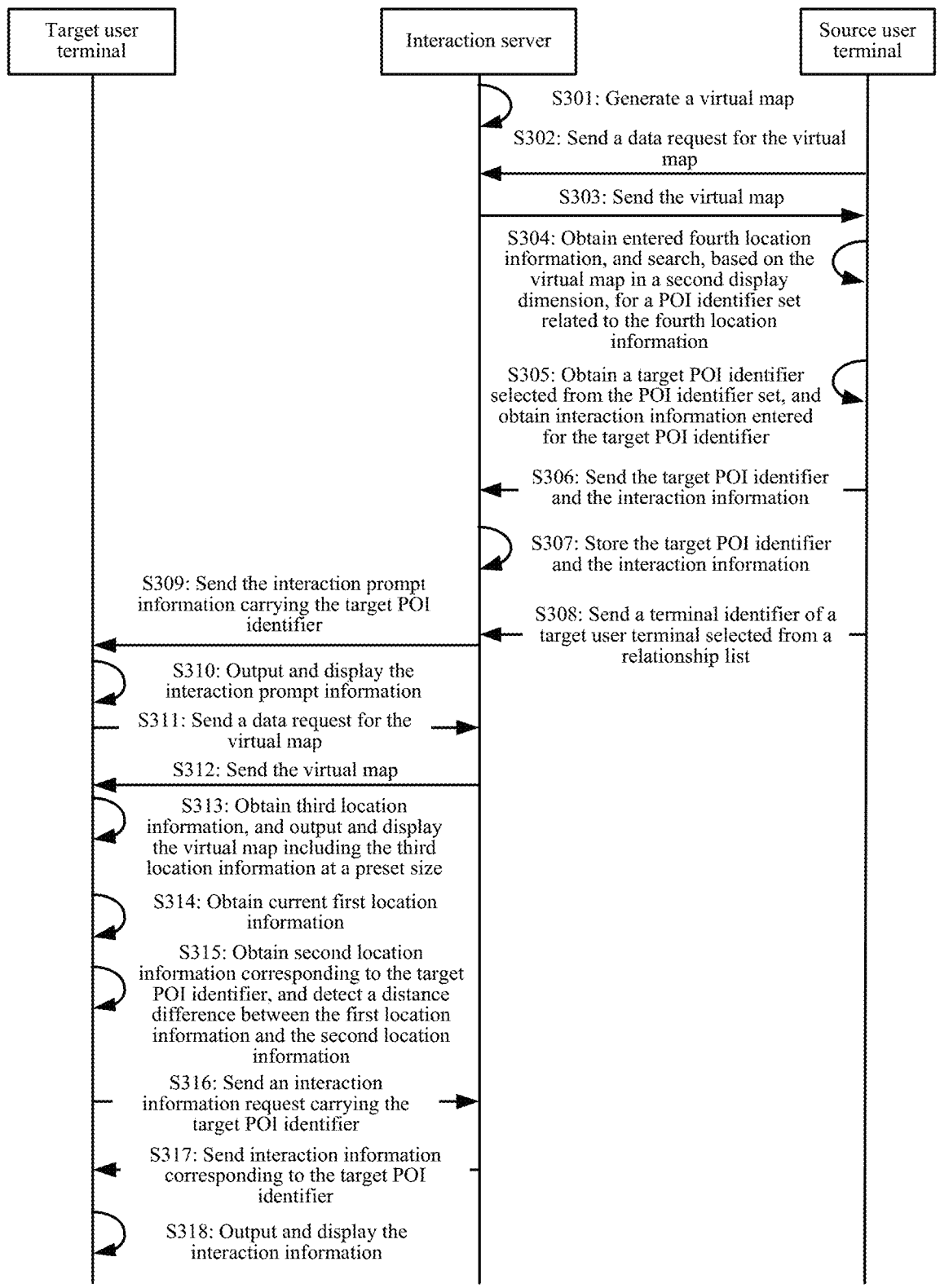
FIG. 6 is a time-sequence flowchart of another interaction information obtaining method according to an embodiment of this application.

FIG. 6 is a time-sequence flowchart of an interaction information obtaining method according to an embodiment of this application. As shown in FIG. 6, in this embodiment of this application, a specific procedure of the interaction information obtaining method is described on all of a target user terminal side, a source user terminal side, and an interaction server side. It should be noted that the method in this embodiment of this application may be specifically applied to a scenario in which interaction information is added when user terminals interact with each other. The method includes the following steps S301 to S318.

S301: An interaction server generates a virtual map by using a plurality of POI identifiers and map data that are obtained in advance.

Specifically, the interaction server may generate the virtual map by using the plurality of POI identifiers and the map data that are obtained in advance. It may be understood that the map data may include specific distribution data about a road, a greenbelt, a lake, and the like. The plurality of POI identifiers may include distribution identifiers of buildings such as a hotel, a residence, a restaurant, and a toll station. The POI identifiers may be specifically symbols marking POIs on the virtual map. The interaction server performs rendering processing on the plurality of POI identifiers and the map data in a preset rendering manner, to generate the virtual map.

The virtual map may include a virtual map in a first display dimension and a virtual map in a second display dimension. The first display dimension may be a three-dimensional display dimension, and the second display dimension may be a two-dimensional display dimension. The virtual map in the first display dimension may be specifically used to display a current location of the target user terminal, and the virtual map in the second display dimension may be specifically used to search for a POI identifier having a relatively long distance or the like.

S302: A source user terminal sends a data request for the virtual map to the interaction server.

Specifically, when detecting that the interaction application is triggered to start, for example, a tap operation is performed on an application icon of the interaction application or a slide operation in a fixed direction is detected on an interface of the interaction application, the source user terminal may send the data request for the virtual map to the interaction server.

S303: The interaction server receives the data request sent by the source user terminal, and sends the virtual map to the source user terminal.

S304: The source user terminal receives the virtual map sent by the interaction server, obtains entered fourth location information, and searches, based on the virtual map in a second display dimension, for a POI identifier set related to the fourth location information.

Specifically, the source user terminal receives the virtual map sent by the interaction server. In some examples, the source user terminal may locally store the virtual map, and when starting the interaction application the next time, may not need to repeatedly obtain the virtual map from the interaction server.

Figure 7:
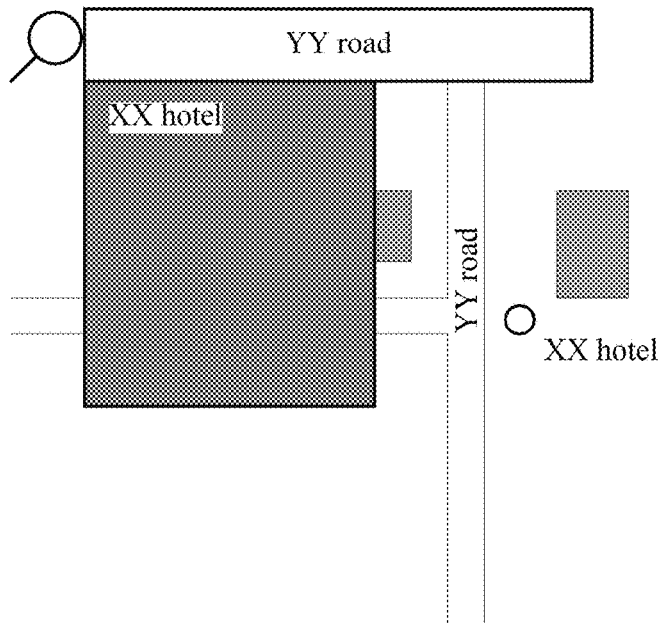
FIG. 7 is a schematic diagram of still another example of obtaining interaction information according to an embodiment of this application.

The source user terminal may obtain the fourth location information entered by the user, and may search, based on the virtual map in the second display dimension, the POI identifier set associated with the fourth location information. The fourth location information may specifically indicate approximate location information of the target POI identifier for which the interaction information needs to be provided. Referring to FIG. 7, the source user terminal may display the virtual map in the two-dimensional display dimension, display a search box, and obtain that the entered fourth location information is a YY road. The YY road may be positioned based on the virtual map in the two-dimensional display dimension, and a POI identifier set, for example, an XX hotel, associated with the YY road may be displayed in a drop-down menu of the search box.

S305: The source user terminal obtains a target POI identifier selected from the POI identifier set, and obtains interaction information entered for the target POI identifier.

Specifically, the source user terminal may obtain the target POI identifier selected from the POI identifier set. For example, in FIG. 7, assuming that the XX hotel is selected from the drop-down menu, a POI identifier of the XX hotel is used as the target POI identifier. The source user terminal may obtain the interaction information entered for the target POI identifier, for example, red envelope data added for the target POI identifier.

S306: The source user terminal sends the target POI identifier and the interaction information to the interaction server.

S307: The interaction server receives the target POI identifier and the interaction information sent by the source user terminal, and stores the target POI identifier and the interaction information.

Specifically, the interaction server receives the target POI identifier and the interaction information sent by the source user terminal, and the interaction server may search for a database corresponding to the target POI identifier, and add the interaction information to the database corresponding to the target POI identifier for storage.

S308: The source user terminal obtains a terminal identifier of a target user terminal selected from a relationship list, and sends the terminal identifier to the interaction server.

Specifically, the source user terminal may further obtain the terminal identifier of the target user terminal selected from the relationship list. It may be understood that, the relationship list may indicate the terminal identifier of the target user terminal whose interaction relationship is added in advance. The terminal identifier may be an application sequence number (ID) allocated when the interaction application is registered on the target user terminal or may be a communication number or the like registered on the target user terminal. A user of the source user terminal may further select an object to which the interaction information is distributed, and the source user terminal may obtain the selected terminal identifier and send the terminal identifier to the interaction server.

It may be understood that, the terminal identifier of the target user terminal, the target POI identifier, and the interaction information may be sent to the interaction server together, or the terminal identifier may be first selected and sent and the target POI identifier and the interaction information are then sent. In this embodiment of this application, a sequence of obtaining and sending the terminal identifier is not limited.

S309: The interaction server receives the terminal identifier sent by the source user terminal, generates interaction prompt information carrying the target POI identifier, and sends the interaction prompt information to the target user terminal corresponding to the terminal identifier.

Specifically, the interaction server receives the terminal identifier of the target user terminal that is sent by the source user terminal, and may further generate the interaction prompt information carrying the target POI identifier, and send the interaction prompt information to the target user terminal corresponding to the terminal identifier. In some examples, the interaction server may further obtain a terminal identifier of the source user terminal, and encapsulate the terminal identifier of the source user terminal to the interaction prompt information. The interaction prompt information is used to prompt the user of the target user terminal that there is obtainable interaction information currently.

S310: The target user terminal receives the interaction prompt information sent by the interaction server, and outputs and displays the interaction prompt information.

Specifically, the target user terminal receives the interaction prompt information sent by the interaction server, and may output and display the interaction prompt information, to prompt the user of the target user terminal that there is obtainable interaction information currently.

S311: When detecting that the interaction application is triggered to start, the target user terminal sends a data request for the virtual map to the interaction server.

S312: The interaction server receives the data request sent by the target user terminal, and sends the virtual map to the target user terminal.

S313: The target user terminal receives the virtual map sent by the interaction server, obtains third location information, and outputs and displays the virtual map including the third location information at a preset size.

S314: When detecting, on the virtual map, a trigger operation performed on the target point of information POI identifier, the target user terminal obtains current first location information based on the interaction application.

S315: The target user terminal obtains second location information corresponding to the target POI identifier, and detects a distance difference between the first location information and the second location information.

S316: When the distance difference satisfies a preset distance range, the target user terminal sends, to the interaction server, an interaction information request carrying the target POI identifier.

S317: The interaction server receives the interaction information request sent by the target user terminal, obtains interaction information corresponding to the target POI identifier, and sends the interaction information to the target user terminal.

S318: The target user terminal receives the interaction information sent by the interaction server, and outputs and displays the interaction information.

In this embodiment of this application, for steps S3.10 to S318, refer to specific descriptions of steps S202 to S209 in the embodiment shown in FIG. 2, and details are not described herein.

In this embodiment of this application, when the operation is triggered on the target POI identifier on the virtual map, the distance difference between the current first location information of the target user terminal and the second location information corresponding to the target POI identifier is obtained on the virtual map, and when the distance difference satisfies the preset distance range, the interaction information corresponding to the target POI identifier may further be obtained from the interaction server, and is outputted and displayed. This implements a process of obtaining POI-related interaction information based on location information, and improves efficiency of viewing POI-related information. In addition, the interaction information may be self-defined and provided by a source user terminal, POI information is viewed in more diversified manners and content displayed by a POI is enriched, and interactivity with a user terminal is improved. Requirements of different using environments can be satisfied, and using by the user can be facilitated by using the virtual maps in different dimensions. The interaction information is encapsulated in the interaction label, so that interactivity with the user terminal can be further improved.

Figure 8:
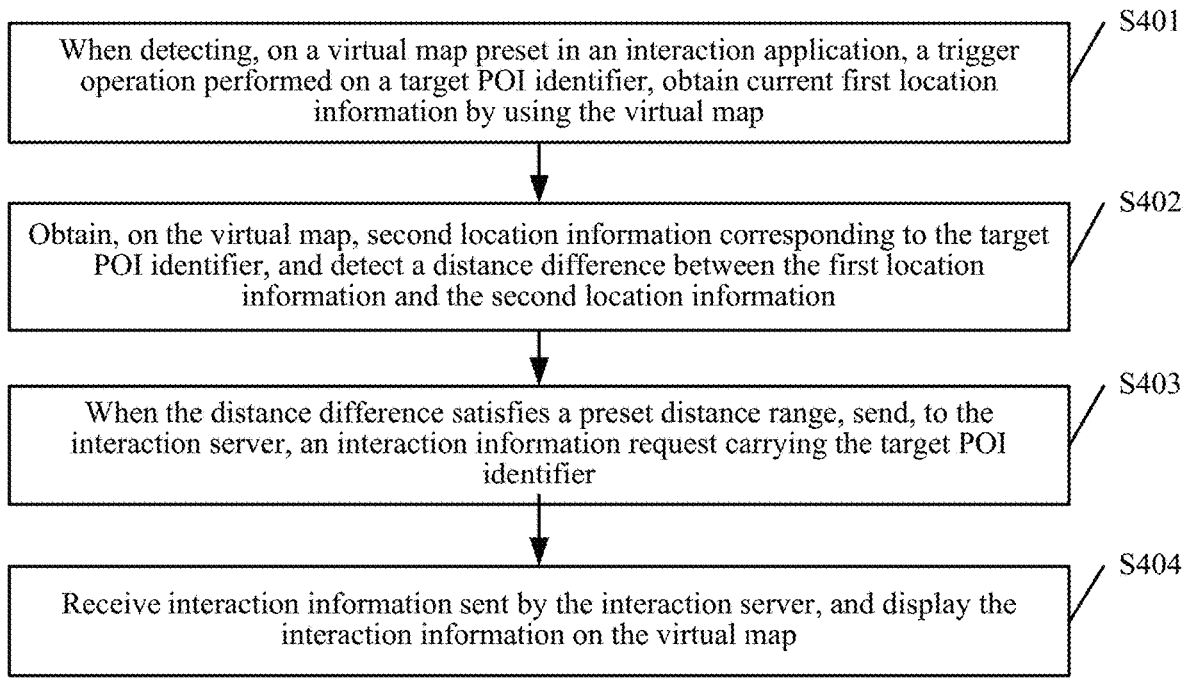
FIG. 8 is a schematic flowchart of another interaction information obtaining method according to an embodiment of this application.

FIG. 8 is a schematic flowchart of another interaction information obtaining method according to an embodiment of this application. As shown in FIG. 8, in this embodiment of this application, a specific procedure of the interaction information obtaining method is described on a target user terminal side. The method includes the following steps S401 to S404.

S401: When detecting, on a virtual map preset in an interaction application, a trigger operation performed on a target POI identifier, obtain current first location information by using the virtual map.

Specifically, when detecting, on the virtual map preset in the interaction application, that the trigger operation is performed on the target POI identifier, for example, a tap operation is performed on the target POI identifier, the target user terminal may obtain the current first location information of the target user terminal based on the interaction application. It may be understood that, the virtual map is a map generated by the interaction server by using a plurality of POI identifiers and map data that are obtained in advance. The interaction server may send the virtual map to the target user terminal for display. The virtual map may include the plurality of POI identifiers, and the target user terminal may detect, from the plurality of POI identifiers of the virtual map, the target POI identifier on which the trigger operation is performed. The POI identifier may be specifically a symbol marking a POI on the virtual map. The first location information is used to indicate actual location information of the target user terminal when it is detected that the trigger operation is performed on the target POI identifier. In some examples, the first location information may be marked on the virtual map.

S402: Obtain, on the virtual map, second location information corresponding to the target POI identifier, and detect a distance difference between the first location information and the second location information.

Specifically, the target user terminal may obtain the second location information corresponding to the target POI identifier. The second location information is used to indicate actual location information of a target POI indicated by the target POI identifier. In some examples, the second location information may be marked on the virtual map. The target user terminal may detect the actual distance difference between the first location information and the second location information based on a positioning function of the target user terminal.

S403: When the distance difference satisfies a preset distance range, send, to the interaction server, an interaction information request carrying the target POI identifier.

Specifically, when detecting that the distance difference between the first location information and the second location information satisfies the preset distance range, the target user terminal may send, to the interaction server, the interaction information request carrying the target POI identifier. In some examples, when the distance difference falls within the preset distance range, for example, when the preset distance range is 0 meter to 50 meters and the distance difference is 45 meters, it is determined that the distance difference satisfies the preset distance range.

The interaction server receives the interaction information request sent by the target user terminal, and may obtain, from a database corresponding to the plurality of POI identifiers, the interaction information corresponding to the target POI identifier, and send the interaction information to the target user terminal.

S404: Receive interaction information sent by the interaction server, and display the interaction information on the virtual map.

Specifically, the target user terminal receives the interaction information that corresponds to the target POI identifier and that is sent by the interaction server, and outputs and displays the interaction information. In some examples, the interaction information may be encapsulated in an interaction label, to improve interactivity with a user terminal. The interaction label may be specifically a trigger button for obtaining the interaction information, and the interaction label may be displayed in a form such as a treasure box or a red envelope. An output and display manner may be specifically displaying the interaction label based on a camera of the target user terminal, to obtain a manner of outputting and displaying the interaction information. Alternatively, at least one interaction label may be used for encapsulation, and the manner of outputting and displaying the interaction information may be randomly obtained.

In this embodiment of this application, when the operation is triggered on the target POI identifier on the virtual map, the distance difference between the current first location information of the target user terminal and the second location information corresponding to the target POI identifier is obtained on the virtual map, and when the distance difference satisfies the preset distance range, the interaction information corresponding to the target POI identifier may further be obtained from the interaction server, and is outputted and displayed. This implements a process of obtaining POI-related interaction information based on location information, and improves efficiency of viewing POI-related information. In addition, the interaction information may be self-defined and provided by a source user terminal, POI information is viewed in more diversified manners and content displayed by a POI is enriched, and interactivity with a user terminal is improved.

Figure 9:
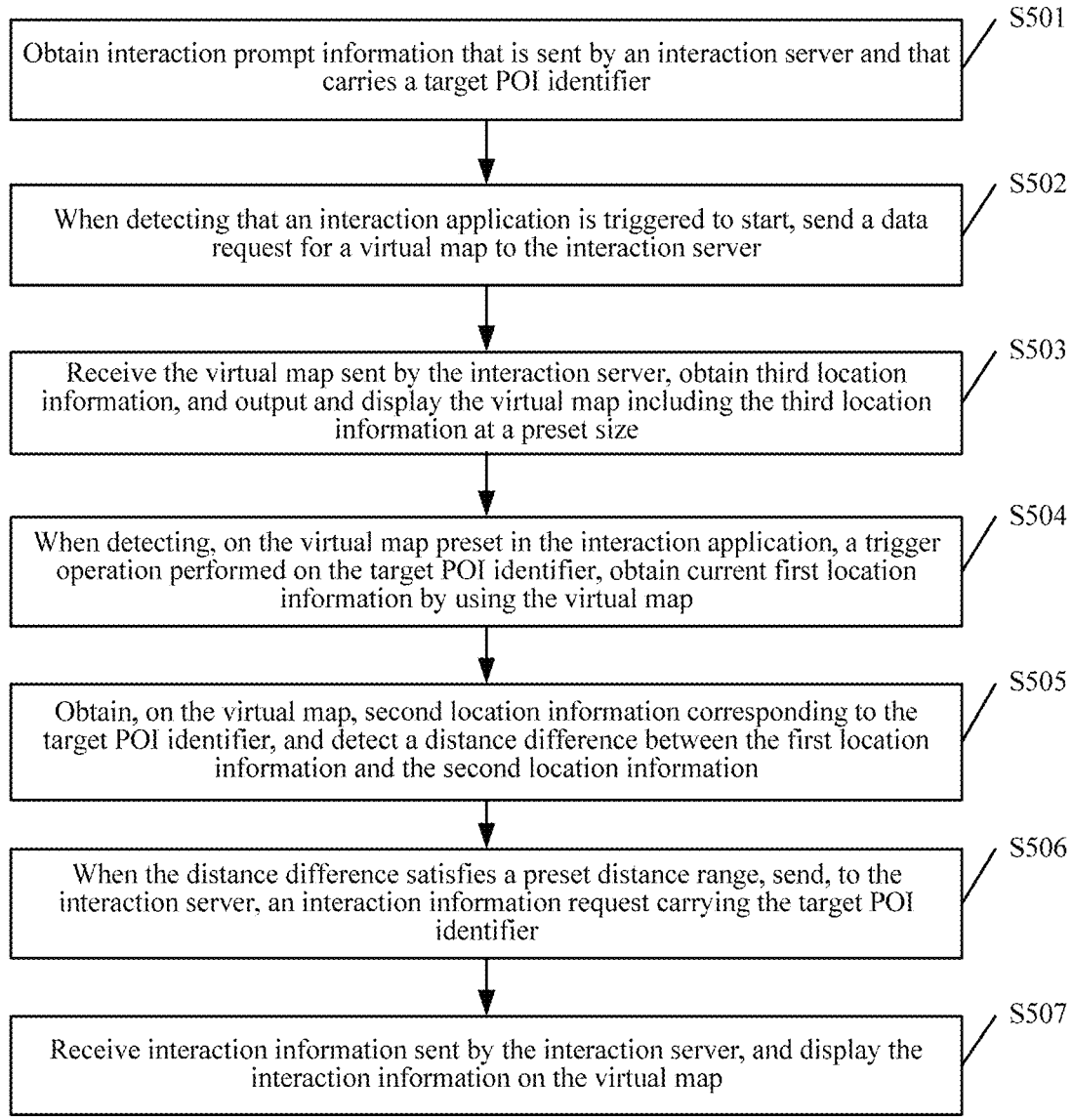
FIG. 9 is a schematic flowchart of still another interaction information obtaining method according to an embodiment of this application.

FIG. 9 is a schematic flowchart of another interaction information obtaining method according to an embodiment of this application. As shown in FIG. 9, in this embodiment of this application, a specific procedure of the interaction information obtaining method is described on a target user terminal side. The method includes the following steps S501 to S507.

S501: Obtain interaction prompt information that is sent by an interaction server and that carries a target POI identifier.

Specifically, the target user terminal may receive the interaction prompt information that is sent by the interaction server and that carries the target POI identifier.

It may be understood that after obtaining the interaction information entered for the target POI identifier, the source user terminal may send the target POI identifier and the interaction information to the interaction server. In addition, the source user terminal may further obtain the terminal identifier of the target user terminal selected from the relationship list. It may be understood that, the relationship list may indicate the terminal identifier of the target user terminal whose interaction relationship is added in advance. The terminal identifier may be an application ID allocated when the interaction application is registered on the target user terminal or may be a communication number or the like registered on the target user terminal. A user of the source user terminal may further select an object to which the interaction information is distributed, and the source user terminal may obtain the selected terminal identifier and send the terminal identifier to the interaction server. The interaction server receives the terminal identifier of the target user terminal that is sent by the source user terminal, and may further generate the interaction prompt information carrying the target POI identifier, and send the interaction prompt information to the target user terminal corresponding to the terminal identifier. In some examples, the interaction server may further obtain a terminal identifier of the source user terminal, and encapsulate the terminal identifier of the source user terminal to the interaction prompt information. The interaction prompt information is used to prompt the user of the target user terminal that there is obtainable interaction information currently.

Alternatively, when obtaining, in advance, the interaction information provided for the target POI identifier, the interaction server may generate and broadcast the interaction prompt information carrying the target POI identifier.

The target user terminal receives the interaction prompt information sent by the interaction server, and may output and display the interaction prompt information, to prompt the user of the target user terminal that there is obtainable interaction information currently.

S502: When detecting that an interaction application is triggered to start, the interaction server sends a data request for a virtual map.

Specifically, when detecting that the interaction application on the target user terminal is triggered to start, for example, a tap operation is performed on an application icon of the interaction application or a slide operation in a fixed direction is detected on an interface of the interaction application, the target user terminal may send the data request for the virtual map to the interaction server. The interaction server receives the data request sent by the target user terminal, and sends the virtual map to the target user terminal.

S503: Receive the virtual map sent by the interaction server, obtain third location information, and output and display the virtual map including the third location information at a preset size.

Specifically, the target user terminal receives the virtual map sent by the interaction server. In some examples, the target user terminal may locally store the virtual map, and when starting the interaction application the next time, may not need to repeatedly obtain the virtual map from the interaction server.

The target user terminal may obtain the third location information, where the third location information is used to indicate actual location information of the target user terminal when the interaction application is triggered to start. In some examples, the third location information may be marked on the virtual map. The target user terminal may output and display the virtual map at a preset size by using the third location information as a center. The preset size may be specifically set based on an empirical value of developing personnel. For example, currently, the target user terminal displays a 200 meters*200 meters virtual map by using the third location information as the center. Certainly, that the third location information is used as the center is only an example for description. Alternatively, the virtual map that uses a third location as a first viewing angle and that includes the left, the right, and the front may be outputted and displayed at a preset size. These all fall within the protection scope of this embodiment of this application.

It should be noted that the virtual map may include a virtual map in a first display dimension and a virtual map in a second display dimension. The first display dimension may be a three-dimensional display dimension, and the second display dimension may be a two-dimensional display dimension. The virtual map in the first display dimension may be specifically used to display a current location of the target user terminal, and the virtual map in the second display dimension may be specifically used to search for a POI identifier having a relatively long distance or the like. Further, the target user terminal obtains third location information, and outputs and displays the virtual map including the third location information in the first display dimension at a first preset size. Referring to FIG. 3, the target user terminal may display the virtual map in the three-dimensional display dimension, where the point A indicates the third location information, that is, actual location information of the target user terminal when the interaction application is triggered to start.

S504: When detecting, on the virtual map preset in the interaction application, a trigger operation performed on the target POI identifier, obtain current first location information by using the virtual map.

Specifically, when detecting, on the virtual map, that the trigger operation is performed on the target POI identifier, for example, a tap operation is performed on the target POI identifier, the target user terminal may obtain the current first location information of the target user terminal based on the interaction application. It may be understood that, the virtual map is a map generated by the interaction server by using a plurality of POI identifiers and map data that are obtained in advance. The interaction server may send the virtual map to the target user terminal for display. The virtual map may include the plurality of POI identifiers, and the target user terminal may detect, from the plurality of POI identifiers of the virtual map, the target POI identifier on which the trigger operation is performed. The POI identifier may be specifically a symbol marking a POI on the virtual map. The first location information is used to indicate actual location information of the target user terminal when it is detected that the trigger operation is performed on the target POI identifier. In some examples, the first location information may be marked on the virtual map. Referring to FIG. 3, because there is a time difference between detection of the trigger operation on the target POI identifier and triggering the interaction application to start, a location of the target user terminal may change from the third location information to the first location information. The point B in FIG. 3 indicates the first location information, and a movement identifier between the point A and the point B is used to describe that the target user terminal already moves from the original point A to the point B. A target POI identifier of the XX hotel is displayed at the point C. When it is detected that a tap operation is performed on the target POI identifier, the current first location information, that is, the point B may be obtained.

S505: Obtain, on the virtual map, second location information corresponding to the target POI identifier, and detect a distance difference between the first location information and the second location information.

Specifically, the target user terminal may obtain the second location information corresponding to the target POI identifier. The second location information is used to indicate actual location information of the target POI indicated by the target POI identifier. In some examples, the second location information may be marked on the virtual map. The target user terminal may detect the actual distance difference between the first location information and the second location information based on a positioning function of the target user terminal. Referring to FIG. 3, the point C in FIG. 3 indicates the second location information, and the point C specifically indicates the second location information of the target POI identifier of the XX hotel.

S506: When the distance difference satisfies a preset distance range, send, to the interaction server, an interaction information request carrying the target POI identifier.

Specifically, when detecting that the distance difference between the first location information and the second location information satisfies the preset distance range, the target user terminal may send, to the interaction server, the interaction information request carrying the target POI identifier. In some examples, when the distance difference falls within the preset distance range, where based on the distance shown in FIG. 3, it is assumed that the preset distance range is 0 meter to 50 meters and the distance difference between the point B and the point C is 45 meters, it is determined that the distance difference satisfies the preset distance range. The interaction server receives the interaction information request sent by the target user terminal, and may obtain, from a database corresponding to the plurality of POI identifiers, the interaction information corresponding to the target POI identifier, and send the interaction information to the target user terminal.

S507: Receive interaction information sent by the interaction server, and display the interaction information on the virtual map.

Specifically, the target user terminal receives the interaction information that corresponds to the target POI identifier and that is sent by the interaction server, and outputs and displays the interaction information. In some examples, the interaction information may be encapsulated in the interaction label, to improve interactivity with a user terminal. The interaction label may be specifically a trigger button for obtaining the interaction information, and the interaction label may be displayed in a form such as a treasure box or a red envelope. An output and display manner may be specifically displaying the interaction label based on a camera of the target user terminal, to obtain a manner of outputting and displaying the interaction information. Alternatively, at least one interaction label may be used for encapsulation, and the manner of outputting and displaying the interaction information may be randomly obtained.

Further, specifically, when the camera is used, the camera of the target user terminal may be started to obtain a current shot picture, and the interaction label is displayed in the current shot picture. It may be understood that, the current shot picture may move as the camera moves, and the interaction label may be provided at a fixed location in the current shot picture. In some examples, a gyroscope of the target user terminal may be used to fix the interaction label. Referring to FIG. 4, the target user terminal may start the camera, the current shot picture of the camera is the gate of the XX hotel, and the interaction label may be displayed in the current shot picture. The box shown in FIG. 4 indicates the interaction label. When detecting that the trigger operation is performed on the interaction label, for example, a tap operation is performed on the interaction label in the current shot picture, the target user terminal may output and display the interaction information and store the interaction information.

Specifically, when at least one interaction label is used, the target user terminal may encapsulate the interaction information based on the preset encapsulation rule, and generate the at least one interaction label after encapsulation. The preset encapsulation rule may specifically define a quantity of encapsulated interaction labels, a location of a target interaction label in which the interaction information is stored, and the like. Referring to FIG. 5, assuming that the preset encapsulation rule is generating left, middle, and right interaction labels after encapsulation and the interaction information is stored in the "right" interaction label, the target user terminal may display the three interaction labels. As shown in FIG. 5, a red envelope is an interaction label, and the three interaction labels are marked as "left", "middle", and "right". When detecting, from the at least one interaction label, that the trigger operation is performed on the target interaction label including the interaction information, for example, in FIG. 5, if a tap operation is performed on the "right" target interaction label, the target user terminal may output and display the interaction information and store the interaction information.

In this embodiment of this application, when the operation is triggered on the target POI identifier on the virtual map, the distance difference between the current first location information of the target user terminal and the second location information corresponding to the target POI identifier is obtained on the virtual map, and when the distance difference satisfies the preset distance range, the interaction information corresponding to the target POI identifier may further be obtained from the interaction server, and is outputted and displayed. This implements a process of obtaining POI-related interaction information based on location information, and improves efficiency of viewing POI-related information. In addition, the interaction information may be self-defined and provided by a source user terminal, POI information is viewed in more diversified manners and content displayed by a POI is enriched, and interactivity with a user terminal is improved. Requirements of different using environments can be satisfied, and using by the user can be facilitated by using the virtual maps in different dimensions. The interaction information is encapsulated in the interaction label, so that interactivity with the user terminal can be further improved.

Figure 10:
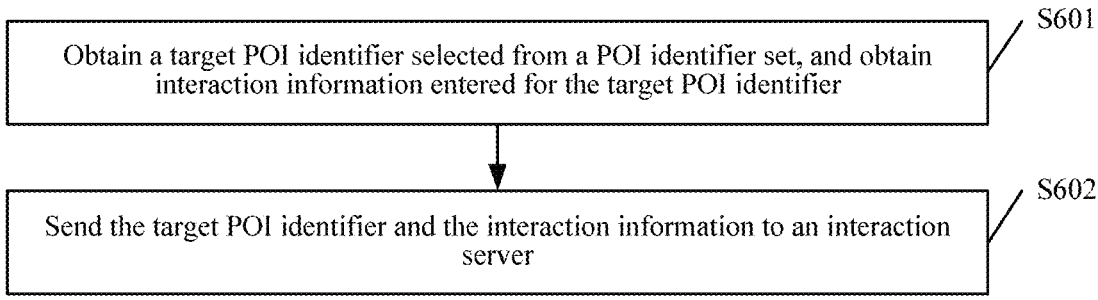
FIG. 10 is a schematic flowchart of an interaction information setting method according to an embodiment of this application.

FIG. 10 is a schematic flowchart of an interaction information setting method according to an embodiment of this application. As shown in FIG. 10, in this embodiment of this application, a specific procedure of the interaction information setting method is described on a source user terminal side. The method includes the following steps S601 to S602.

S601: Obtain a target POI identifier selected from a POI identifier set, and obtain interaction information entered for the target POI identifier.

Specifically, the source user terminal may obtain the target POI identifier selected from the POI identifier set. Further, the source user terminal may obtain, based on a virtual map obtained from the interaction server in advance, entered location information that needs to be searched for. The source user terminal may search for a POI identifier set associated with the location information, and display the POI identifier set. The source user terminal may obtain the target POI identifier selected from the POI identifier set by the user, and obtain the interaction information entered for the target POI identifier. For example, the source user terminal selects a form of encapsulating the interaction information, for example, a treasure box, a red envelope, or a task for the target POI identifier, and adds the interaction information to the selected form, for example, adds red envelope data. The red envelope data may be a quantity of red envelopes and a location of a red envelope for storing the interaction information. For example, a coupon and the like are stored in the second left red envelope.

S602: Send the target POI identifier and the interaction information to the interaction server.

Specifically, the source user terminal sends the target POI identifier and the interaction information to the interaction server. The interaction server receives the target POI identifier and the interaction information sent by the source user terminal, and the interaction server may search for a database corresponding to the target POI identifier, and add the interaction information to the database corresponding to the target POI identifier for storage.

In this embodiment of this application, the corresponding target POI identifier is determined based on the found location information, and the interaction information is displayed. Therefore, a process of setting the POI-related interaction information based on the location information is implemented, POI information is viewed in diversified manners and content displayed by a POI is enriched, and interactivity with the user terminal is improved.

Figure 11:
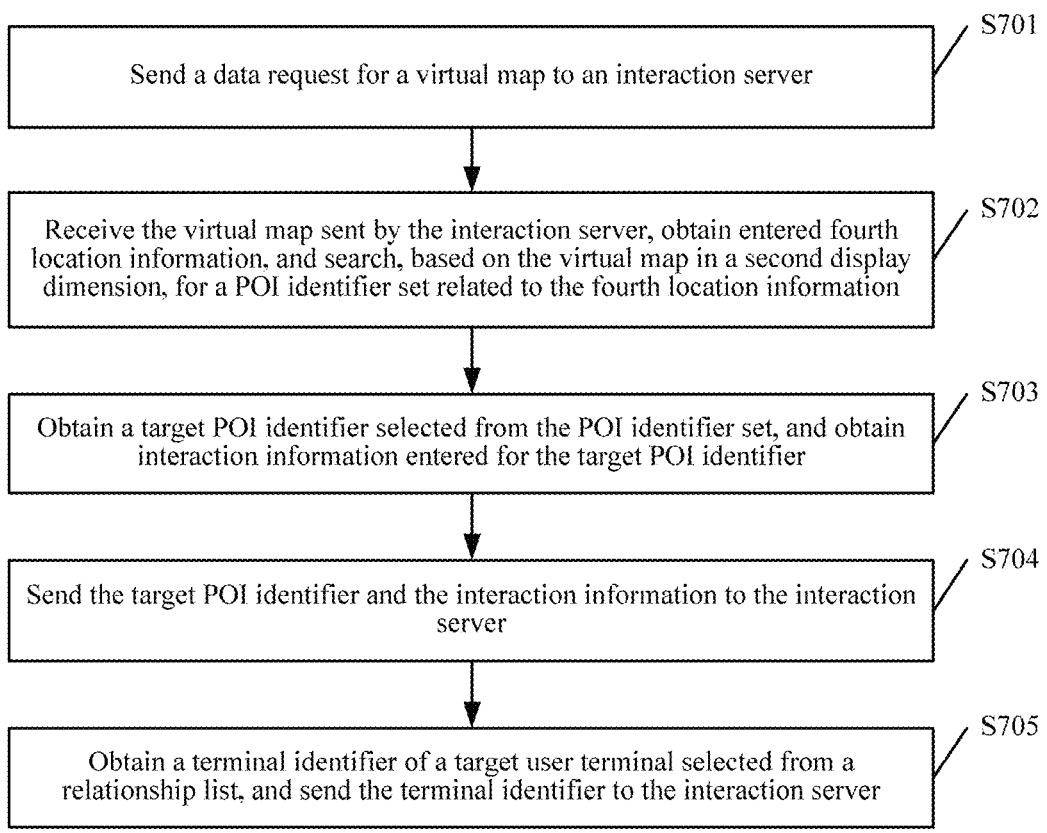
FIG. 11 is a schematic flowchart of another interaction information setting method according to an embodiment of this application.

FIG. 11 is a schematic flowchart of another interaction information setting method according to an embodiment of this application. As shown in FIG. 11, in this embodiment of this application, a specific procedure of the interaction information setting method is described on a source user terminal side. The method includes the following steps S701 to S705.

S701: Send a data request for a virtual map to an interaction server.

Specifically, when detecting that the interaction application is triggered to start, for example, a tap operation is performed on an application icon of the interaction application or a slide operation in a fixed direction is detected on an interface of the interaction application, the source user terminal may send the data request for the virtual map to the interaction server. The interaction server receives the data request sent by the source user terminal, and sends the virtual map to the source user terminal.

It may be understood that the interaction server may generate the virtual map by using the plurality of POI identifiers and the map data that are obtained in advance. It may be understood that the map data may include specific distribution data about a road, a greenbelt, a lake, and the like. The plurality of POI identifiers may include distribution identifiers of buildings such as a hotel, a residence, a restaurant, and a toll station. The POI identifiers may be specifically symbols marking POIs on the virtual map. The interaction server performs rendering processing on the plurality of POI identifiers and the map data in a preset rendering manner, to generate the virtual map.

The virtual map may include a virtual map in a first display dimension and a virtual map in a second display dimension. The first display dimension may be a three-dimensional display dimension, and the second display dimension may be a two-dimensional display dimension. The virtual map in the first display dimension may be specifically used to display a current location of the target user terminal, and the virtual map in the second display dimension may be specifically used to search for a POI identifier having a relatively long distance or the like.

S702: Receive the virtual map sent by the interaction server, obtain entered fourth location information, and search, based on the virtual map in a second display dimension, for a POI identifier set related to the fourth location information.

Specifically, the source user terminal receives the virtual map sent by the interaction server. In some examples, the source user terminal may locally store the virtual map, and when starting the interaction application the next time, may not need to repeatedly obtain the virtual map from the interaction server.

The source user terminal may obtain the fourth location information entered by the user, and may search, based on the virtual map in the second display dimension, the POI identifier set associated with the fourth location information. The fourth location information may specifically indicate approximate location information of the target POI identifier for which the interaction information needs to be provided. Referring to FIG. 7, the source user terminal may display the virtual map in the two-dimensional display dimension, display a search box, and obtain that the entered fourth location information is the YY road. The YY road may be positioned based on the virtual map in the two-dimensional display dimension, and a POI identifier set, for example, the XX hotel, associated with the YY road may be displayed in a drop-down menu of the search box.

S703: Obtain a target POI identifier selected from the POI identifier set, and obtain interaction information entered for the target POI identifier.

Specifically, the source user terminal may obtain the target POI identifier selected from the POI identifier set. For example, in FIG. 7, assuming that the XX hotel is selected from the drop-down menu, a POI identifier of the XX hotel is used as the target POI identifier. The source user terminal may obtain the interaction information entered for the target POI identifier, for example, red envelope data added for the target POI identifier.

S704: Send the target POI identifier and the interaction information to the interaction server.

Specifically, the source user terminal sends the target POI identifier and the interaction information to the interaction server. The interaction server receives the target POI identifier and the interaction information sent by the source user terminal, and the interaction server may search for a database corresponding to the target POI identifier, and add the interaction information to the database corresponding to the target POI identifier for storage.

S705: Obtain a terminal identifier of a target user terminal selected from a relationship list, and send the terminal identifier to the interaction server.

Specifically, the source user terminal may further obtain the terminal identifier of the target user terminal selected from the relationship list. It may be understood that, the relationship list may indicate the terminal identifier of the target user terminal whose interaction relationship is added in advance. The terminal identifier may be an application ID allocated when the interaction application is registered on the target user terminal or may be a communication number or the like registered on the target user terminal. A user of the source user terminal may further select an object to which the interaction information is distributed, and the source user terminal may obtain the selected terminal identifier and send the terminal identifier to the interaction server.

It may be understood that, the terminal identifier of the target user terminal, the target POI identifier, and the interaction information may be sent to the interaction server together, or the terminal identifier may be first selected and sent and the target POI identifier and the interaction information are then sent. In this embodiment of this application, a sequence of obtaining and sending the terminal identifier is not limited.

The interaction server receives the terminal identifier of the target user terminal that is sent by the source user terminal, and may further generate the interaction prompt information carrying the target POI identifier, and send the interaction prompt information to the target user terminal corresponding to the terminal identifier. In some examples, the interaction server may further obtain a terminal identifier of the source user terminal, and encapsulate the terminal identifier of the source user terminal to the interaction prompt information. The interaction prompt information is used to prompt the user of the target user terminal that there is obtainable interaction information currently.

In this embodiment of this application, the corresponding target POI identifier is determined based on the found location information, and the interaction information is displayed. Therefore, a process of setting the POI-related interaction information based on the location information is implemented, POI information is viewed in diversified manners and content displayed by a POI is enriched, and interactivity with the user terminal is improved. Requirements of different using environments can be satisfied, and using by the user can be facilitated by using the virtual maps in different dimensions. The terminal identifier of the target user terminal that needs to be notified is selected from the relationship list, so that a process of prompting the interaction information is specifically implemented, and interactivity with the user terminal is further improved.

The following describes user terminals in embodiments of this application in detail with reference to FIG. 12 to FIG. 15. It should be noted that the user terminals shown in FIG. 12 to FIG. 15 may be specifically the target user terminal in the foregoing embodiments, and are configured to perform the methods in the embodiments shown in FIG. 8 and FIG. 9 of this application. For ease of description, only a part related to this embodiment of this application is shown, and for specific technical details not disclosed, refer to the embodiments shown in FIG. 8 and FIG. 9 of this application.

Figure 12:
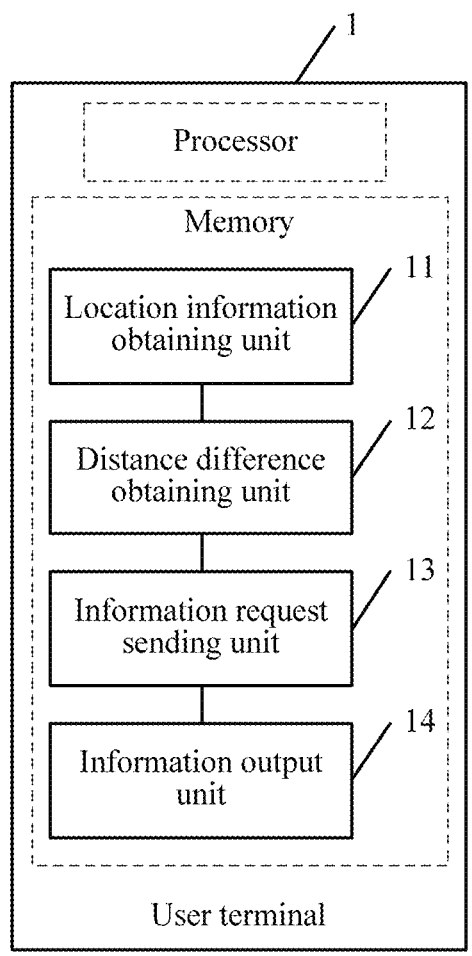
FIG. 12 is a schematic structural diagram of a user terminal according to an embodiment of this application.

FIG. 12 is a schematic structural diagram of a user terminal according to an embodiment of this application. As shown in FIG. 12, the user terminal 1 in this embodiment of this application may include: one or more memories; and one or more processors, where the one or more memories store one or more instruction modules, configured to be executed by the one or more processors; and the one or more instruction modules include: a location information obtaining unit 11, a distance difference obtaining unit 12, an information request sending unit 13, and an information output unit 14.

The location information obtaining unit 11 is configured to: when detecting, on a virtual map, a trigger operation performed on a target POI identifier, obtain current first location information based on an interaction application.

In a specific implementation, when the user terminal 1 detects, on the virtual map, that the trigger operation is performed on the target POI identifier, for example, a tap operation is performed on the target POI identifier, the location information obtaining unit 11 may obtain the current first location information of the user terminal 1 based on the interaction application. It may be understood that, the virtual map is a map generated by the interaction server by using a plurality of POI identifiers and map data that are obtained in advance. The interaction server may send the virtual map to the user terminal 1 for display. The virtual map may include the plurality of POI identifiers, and the user terminal 1 may detect, from the plurality of POI identifiers of the virtual map, the target POI identifier on which the trigger operation is performed. The POI identifier may be specifically a symbol marking a POI on the virtual map. The first location information is used to indicate actual location information of the user terminal 1 when it is detected that the trigger operation is performed on the target POI identifier. In some examples, the first location information may be marked on the virtual map.

The distance difference obtaining unit 12 is configured to: obtain second location information corresponding to the target POI identifier, and detect a distance difference between the first location information and the second location information.

In a specific implementation, the distance difference obtaining unit 12 may obtain the second location information corresponding to the target POI identifier. The second location information is used to indicate actual location information of the target POI indicated by the target POI identifier. In some examples, the second location information may be marked on the virtual map. The distance difference obtaining unit 12 may detect the actual distance difference between the first location information and the second location information based on a positioning function of the user terminal 1.

The information request sending unit 13 is configured to: when the distance difference satisfies a preset distance range, send, to the interaction server, an interaction information request carrying the target POI identifier.

In a specific implementation, when the user terminal 1 detects that the distance difference between the first location information and the second location information satisfies the preset distance range, the information request sending unit 13 may send, to the interaction server, the interaction information request carrying the target POI identifier. In some examples, when the distance difference falls within the preset distance range, for example, when the preset distance range is 0 meter to 50 meters and the distance difference is 45 meters, it is determined that the distance difference satisfies the preset distance range.

The interaction server receives the interaction information request sent by the user terminal 1, and may obtain, from a database corresponding to the plurality of POI identifiers, the interaction information corresponding to the target POI identifier, and send the interaction information to the user terminal 1.

The information output unit 14 is configured to: receive the interaction information sent by the interaction server, and output and display the interaction information.

In a specific implementation, the information output unit 14 receives the interaction information that corresponds to the target POI identifier and that is sent by the interaction server, and outputs and displays the interaction information. In some examples, the interaction information may be encapsulated in the interaction label, to improve interactivity with a user terminal. The interaction label may be specifically a trigger button for obtaining the interaction information, and the interaction label may be displayed in a form such as a treasure box or a red envelope. An output and display manner may be specifically displaying the interaction label based on a camera of the user terminal 1, to obtain a manner of outputting and displaying the interaction information. Alternatively, at least one interaction label may be used for encapsulation, and the manner of outputting and displaying the interaction information may be randomly obtained.

In this embodiment of this application, when the operation is triggered on the target POI identifier on the virtual map, the distance difference between the current first location information of the target user terminal and the second location information corresponding to the target POI identifier is obtained on the virtual map, and when the distance difference satisfies the preset distance range, the interaction information corresponding to the target POI identifier may further be obtained from the interaction server, and is outputted and displayed. This implements a process of obtaining POI-related interaction information based on location information, and improves efficiency of viewing POI-related information. In addition, the interaction information may be self-defined and provided by a source user terminal, POI information is viewed in more diversified manners and content displayed by a POI is enriched, and interactivity with a user terminal is improved.

Figure 13:
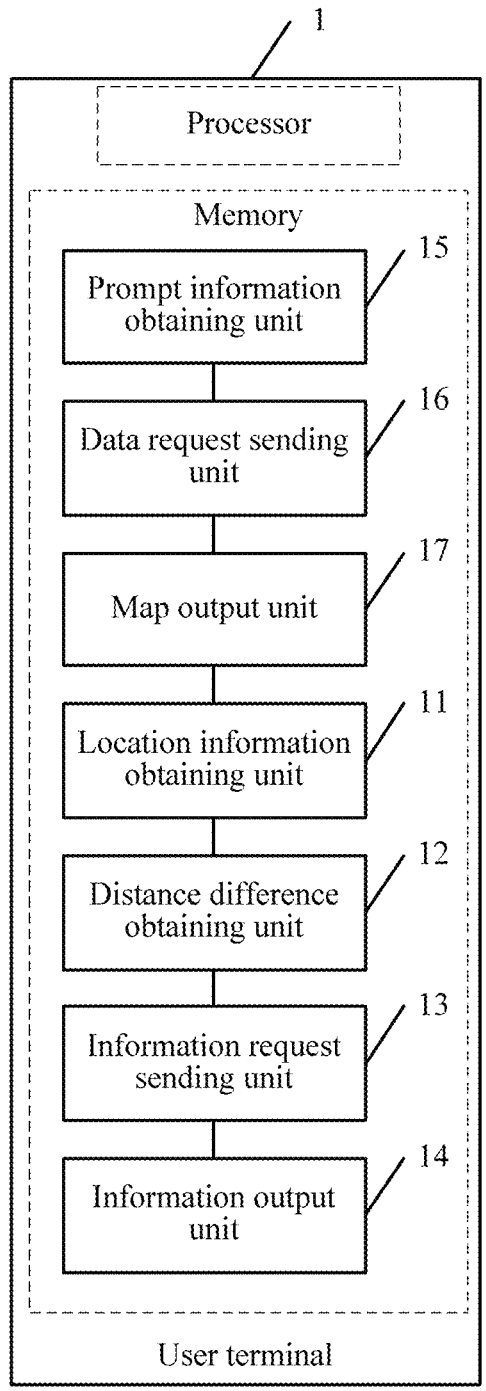
FIG. 13 is a schematic structural diagram of another user terminal according to an embodiment of this application.

FIG. 13 is a schematic structural diagram of another user terminal according to an embodiment of this application. As shown in FIG. 13, the user terminal 1 in this embodiment of this application may include: one or more memories; and one or more processors, where the one or more memories store one or more instruction modules, configured to be executed by the one or more processors; and the one or more instruction modules include a location information obtaining unit 11, a distance difference obtaining unit 12, an information request sending unit 13, an information output unit 14, a prompt information obtaining unit 15, a data request sending unit 16, and a map output unit 17 shown in FIG. 13.

The prompt information obtaining unit 15 is configured to obtain interaction prompt information that is sent by an interaction server and that carries a target POI identifier.

In a specific implementation, the prompt information obtaining unit 15 may receive the interaction prompt information that is sent by the interaction server and that carries the target POI identifier.

It may be understood that after obtaining the interaction information entered for the target POI identifier, the source user terminal may send the target POI identifier and the interaction information to the interaction server. In addition, the source user terminal may further obtain the terminal identifier of the user terminal 1 selected from the relationship list for the interaction information. It may be understood that, the relationship list may indicate the terminal identifier of the user terminal 1 whose interaction relationship is added in advance. The terminal identifier may be an application ID allocated when the interaction application is registered on the user terminal 1 or may be a communication number or the like registered on the target user terminal 1. A user of the source user terminal may further select an object to which the interaction information is distributed, and the source user terminal may obtain the selected terminal identifier and send the terminal identifier to the interaction server. The interaction server receives the terminal identifier of the user terminal 1 that is sent by the source user terminal, and may further generate the interaction prompt information carrying the target POI identifier, and send the interaction prompt information to the user terminal 1 corresponding to the terminal identifier. In some examples, the interaction server may further obtain a terminal identifier of the source user terminal, and encapsulate the terminal identifier of the source user terminal to the interaction prompt information. The interaction prompt information is used to prompt the user of the user terminal 1 that there is obtainable interaction information currently.

Alternatively, when obtaining, in advance, the interaction information provided for the target POI identifier, the interaction server may generate and broadcast the interaction prompt information carrying the target POI identifier.

The prompt information obtaining unit 15 receives the interaction prompt information sent by the interaction server, and may output and display the interaction prompt information, to prompt the user of the user terminal 1 that currently there is obtainable interaction information.

The data request sending unit 16 is configured to: when detecting that an interaction application is triggered to start, send a data request for a virtual map to the interaction server.

Specifically, when detecting that the interaction application on the user terminal 1 is triggered to start, for example, a tap operation is performed on an application icon of the interaction application or a slide operation in a fixed direction is detected on an interface of the interaction application, the data request sending unit 16 may send the data request for the virtual map to the interaction server. The interaction server receives the data request sent by the user terminal 1, and sends the virtual map to the user terminal 1.

The map output unit 17 is configured to receive the virtual map sent by the interaction server, obtain third location information, and output and display the virtual map including the third location information at a preset size.

In a specific implementation, the map output unit 17 receives the virtual map sent by the interaction server. In some examples, the map output unit 17 may locally store the virtual map, and when starting the interaction application the next time, may not need to repeatedly obtain the virtual map from the interaction server.

The map output unit 17 may obtain the third location information, where the third location information is used to indicate actual location information of the user terminal 1 when the interaction application is triggered to start. In some examples, the third location information may be marked on the virtual map. The map output unit 17 may output and display the virtual map at a preset size by using the third location information as a center. The preset size may be specifically set based on an empirical value of developing personnel. For example, currently, the user terminal 1 displays a 200 meters*200 meters virtual map by using the third location information as the center. Certainly, that the third location information is used as the center is only an example for description. Alternatively, the virtual map that uses a third location as a first viewing angle and that includes the left, the right, and the front may be outputted and displayed at a preset size. These all fall within the protection scope of this embodiment of this application.

It should be noted that the virtual map may include a virtual map in a first display dimension and a virtual map in a second display dimension. The first display dimension may be a three-dimensional display dimension, and the second display dimension may be a two-dimensional display dimension. The virtual map in the first display dimension may be specifically used to display a current location of the user terminal 1, and the virtual map in the second display dimension may be specifically used to search for a POI identifier having a relatively long distance or the like. Further, the map output unit 17 obtains third location information, and outputs and displays the virtual map including the third location information in the first display dimension at a first preset size. Referring to FIG. 3, the user terminal 1 may display the virtual map in the three-dimensional display dimension, where the point A indicates the third location information, that is, actual location information of the user terminal 1 when the interaction application is triggered to start.

The location information obtaining unit 11 is configured to: when detecting, on the virtual map, a trigger operation performed on the target POI identifier, obtain current first location information based on the interaction application.

In a specific implementation, when the user terminal 1 detects, on the virtual map, that the trigger operation is performed on the target POI identifier, for example, a tap operation is performed on the target POI identifier, the location information obtaining unit 11 may obtain the current first location information of the user terminal 1 based on the interaction application. It may be understood that, the virtual map is a map generated by the interaction server by using a plurality of POI identifiers and map data that are obtained in advance. The interaction server may send the virtual map to the user terminal 1 for display. The virtual map may include the plurality of POI identifiers, and the location information obtaining unit 11 may detect, from the plurality of POI identifiers of the virtual map, the target POI identifier on which the trigger operation is performed. The POI identifier may be specifically a symbol marking a POI on the virtual map. The first location information is used to indicate actual location information of the user terminal 1 when it is detected that the trigger operation is performed on the target POI identifier. In some examples, the first location information may be marked on the virtual map. Referring to FIG. 3, because there is a time difference between detection of the trigger operation on the target POI identifier and triggering the interaction application to start, a location of the user terminal 1 may change from the third location information to the first location information. The point B in FIG. 3 indicates the first location information, and a movement identifier between the point A and the point B is used to describe that the user terminal 1 already moves from the original point A to the point B. A target POI identifier of the XX hotel is displayed at the point C. When it is detected that a tap operation is performed on the target POI identifier, the current first location information, that is, the point B may be obtained.

The distance difference obtaining unit 12 is configured to: obtain second location information corresponding to the target POI identifier, and detect a distance difference between the first location information and the second location information.

In a specific implementation, the distance difference obtaining unit 12 may obtain the second location information corresponding to the target POI identifier. The second location information is used to indicate actual location information of the target POI indicated by the target POI identifier. In some examples, the second location information may be marked on the virtual map. The distance difference obtaining unit 12 may detect the actual distance difference between the first location information and the second location information based on a positioning function of the user terminal 1. Referring to FIG. 3, the point C in FIG. 3 indicates the second location information, and the point C specifically indicates the second location information of the target POI identifier of the XX hotel.

The information request sending unit 13 is configured to: when the distance difference satisfies a preset distance range, send, to the interaction server, an interaction information request carrying the target POI identifier.

In a specific implementation, when the user terminal 1 detects that the distance difference between the first location information and the second location information satisfies the preset distance range, the information request sending unit 13 may send, to the interaction server, the interaction information request carrying the target POI identifier. In some examples, when the distance difference falls within the preset distance range, where based on the distance shown in FIG. 3, it is assumed that the preset distance range is 0 meter to 50 meters and the distance difference between the point B and the point C is 45 meters, it is determined that the distance difference satisfies the preset distance range. The interaction server receives the interaction information request sent by the user terminal 1, and may obtain, from a database corresponding to the plurality of POI identifiers, the interaction information corresponding to the target POI identifier, and send the interaction information to the user terminal 1.

The information output unit 14 is configured to: receive the interaction information sent by the interaction server, and output and display the interaction information.

In a specific implementation, the information output unit 14 receives the interaction information that corresponds to the target POI identifier and that is sent by the interaction server, and outputs and displays the interaction information. In some examples, the interaction information may be encapsulated in the interaction label, to improve interactivity with a user terminal. The interaction label may be specifically a trigger button for obtaining the interaction information, and the interaction label may be displayed in a form such as a treasure box or a red envelope. An output and display manner may be specifically displaying the interaction label based on a camera of the user terminal 1, to obtain a manner of outputting and displaying the interaction information. Alternatively, at least one interaction label may be used for encapsulation, and the manner of outputting and displaying the interaction information may be randomly obtained.

Figure 14:
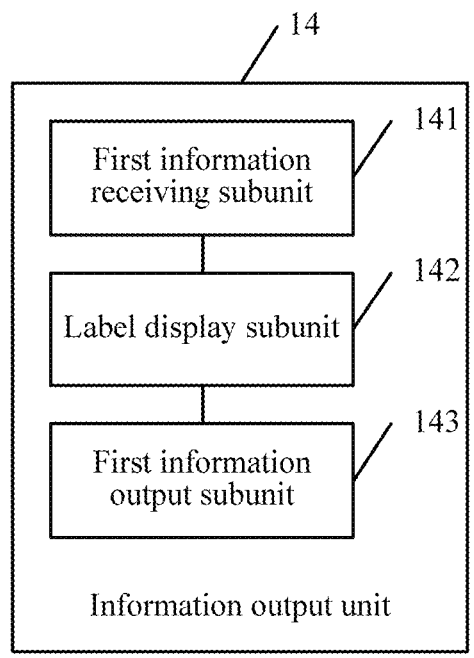
FIG. 14 is a schematic structural diagram of an information output unit according to an embodiment of this application.

Specifically, when a camera is used, refer to FIG. 14. FIG. 14 is a schematic structural diagram of an information output unit according to an embodiment of this application. As shown in FIG. 14, the information output unit 14 may include:

a first information receiving subunit 141, configured to receive the interaction information sent by the interaction server;

a label display subunit 142, configured to: start a camera to obtain a current shot picture, and display, in the shot picture, an interaction label; and a first information output subunit 143, configured to: when detecting a trigger operation performed on the interaction label, output and display the interaction information.

In a specific implementation, the label display subunit 142 starts the camera to obtain the current shot picture, and displays the interaction label in the current shot picture. It may be understood that, the current shot picture may move as the camera moves, and the interaction label may be provided at a fixed location in the current shot picture. In some examples, a gyroscope of the user terminal 1 may be used to fix the interaction label. Referring to FIG. 4, the label display subunit 142 may start the camera, the current shot picture of the camera is the gate of the XX hotel, and the interaction label may be displayed in the current shot picture. The box shown in FIG. 4 indicates the interaction label.

In a specific implementation, when the user terminal 1 detects that the trigger operation is performed on the interaction label, for example, a tap operation is performed on the interaction label in the current shot picture, the first information output subunit 143 may output and display the interaction information and store the interaction information.

Figure 15:
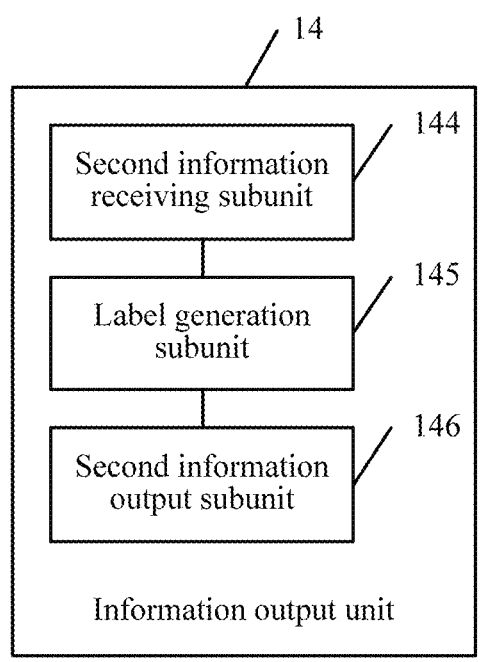
FIG. 15 is a schematic structural diagram of another information output unit according to an embodiment of this application.

Specifically, when at least one interaction label is used, refer to FIG. 15. FIG. 15 is a schematic structural diagram of another information output unit according to an embodiment of this application. As shown in FIG. 15, the information output unit 14 may include:

a second information receiving subunit 144, configured to receive the interaction information sent by the interaction server;

a label generation subunit 145, configured to: encapsulate the interaction information based on a preset encapsulation rule, and generate at least one interaction label after encapsulation; and a second information output subunit 146, configured to: when detecting a trigger operation performed on a target interaction label that is of the at least one interaction label and that includes the interaction information, output and display the interaction information.

In a specific implementation, the label generation subunit 145 may encapsulate the interaction information based on the preset encapsulation rule, and generate the at least one interaction label after encapsulation. The preset encapsulation rule may specifically define a quantity of encapsulated interaction labels, a location of a target interaction label in which the interaction information is stored, and the like. Referring to FIG. 5, assuming that the preset encapsulation rule is generating left, middle, and right interaction labels after encapsulation and the interaction information is stored in the "right" interaction label, the label generation subunit 145 may display the three interaction labels. As shown in FIG. 5, a red envelope is an interaction label, and the three interaction labels are marked as "left", "middle", and "right".

In a specific implementation, when the user terminal 1 detects, from the at least one interaction label, that the trigger operation is performed on the target interaction label including the interaction information, for example, in FIG. 5, if a tap operation is performed on the "right" target interaction label, the second information output subunit 146 may output and display the interaction information and store the interaction information.

In this embodiment of this application, when the operation is triggered on the target POI identifier on the virtual map, the distance difference between the current first location information of the target user terminal and the second location information corresponding to the target POI identifier is obtained on the virtual map, and when the distance difference satisfies the preset distance range, the interaction information corresponding to the target POI identifier may further be obtained from the interaction server, and is outputted and displayed. This implements a process of obtaining POI-related interaction information based on location information, and improves efficiency of viewing POI-related information. In addition, the interaction information may be self-defined and provided by a source user terminal, POI information is viewed in more diversified manners and content displayed by a POI is enriched, and interactivity with a user terminal is improved. Requirements of different using environments can be satisfied, and using by the user can be facilitated by using the virtual maps in different dimensions. The interaction information is encapsulated in the interaction label, so that interactivity with the user terminal can be further improved.

Figure 16:
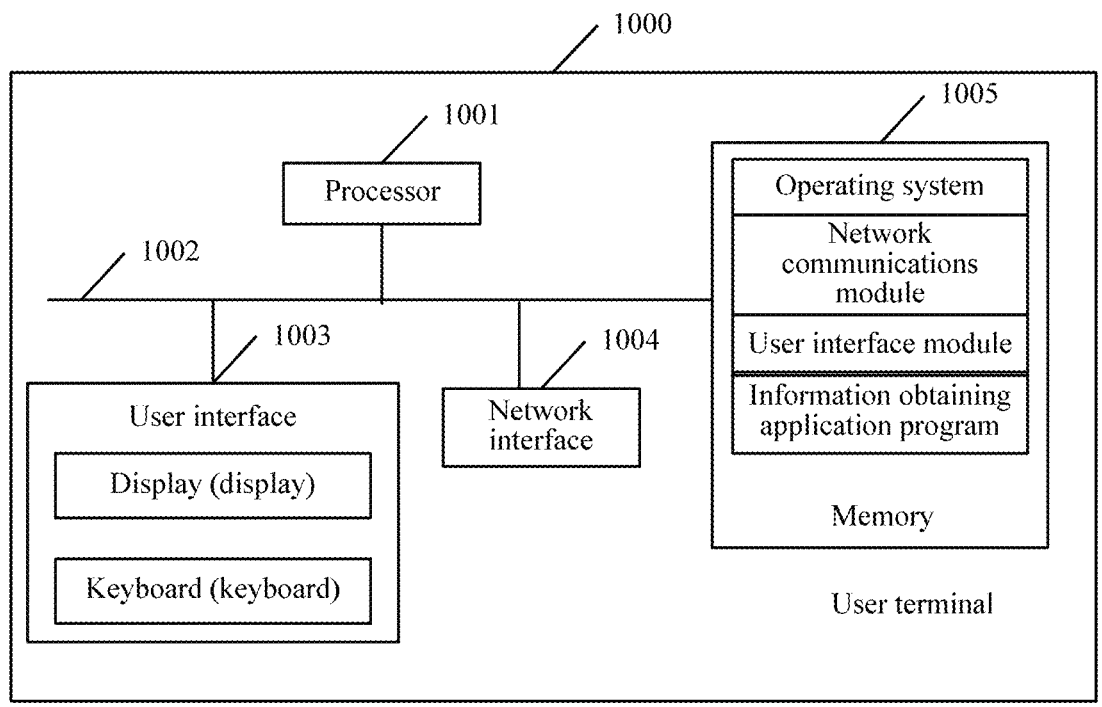
FIG. 16 is a schematic structural diagram of another user terminal according to an embodiment of this application.

FIG. 16 is a schematic structural diagram of another user terminal according to an embodiment of this application. As shown in FIG. 16, the user terminal 1000 may include: at least one processor 1001, for example, a CPU, at least one network interface 1004, a user interface 1003, a memory 1005, and at least one communications bus 1002. The communications bus 1002 is configured to implement connection and communication between these components. The user interface 1003 may include a display, a keyboard, and optionally, the user interface 1003 may further include a standard wired interface and a standard wireless interface. The network interface 1004 optionally may include a standard wired interface and a standard wireless interface (for example, a WI-FI interface). The memory 1005 may be a high-speed RAM memory, or may be a non-volatile memory, for example, at least one magnetic disk storage. Optionally, the memory 1005 may be at least one storage apparatus that is located far away from the foregoing processor 1001. As shown in FIG. 16, the memory 1005 as a computer storage medium may include an operating system, a network communications module, a user interface module, and an information obtaining application program.

In the user terminal 1000 shown in FIG. 16, the user interface 1003 is mainly configured to: provide an input interface for a user, and obtain data entered by the user. The processor 1001 may be configured to invoke the information obtaining application program stored in the memory 1005, and is configured to perform the operations in the method embodiment performed by the target user terminal in this application.

In this embodiment of this application, when the operation is triggered on the target POI identifier on the virtual map, the distance difference between the current first location information of the target user terminal and the second location information corresponding to the target POI identifier is obtained on the virtual map, and when the distance difference satisfies the preset distance range, the interaction information corresponding to the target POI identifier may further be obtained from the interaction server, and is outputted and displayed. This implements a process of obtaining POI-related interaction information based on location information, and improves efficiency of viewing POI-related information. In addition, the interaction information may be self-defined and provided by a source user terminal, POI information is viewed in more diversified manners and content displayed by a POI is enriched, and interactivity with a user terminal is improved. Requirements of different using environments can be satisfied, and using by the user can be facilitated by using the virtual maps in different dimensions. The interaction information is encapsulated in the interaction label, so that interactivity with the user terminal can be further improved.

Figure 17:
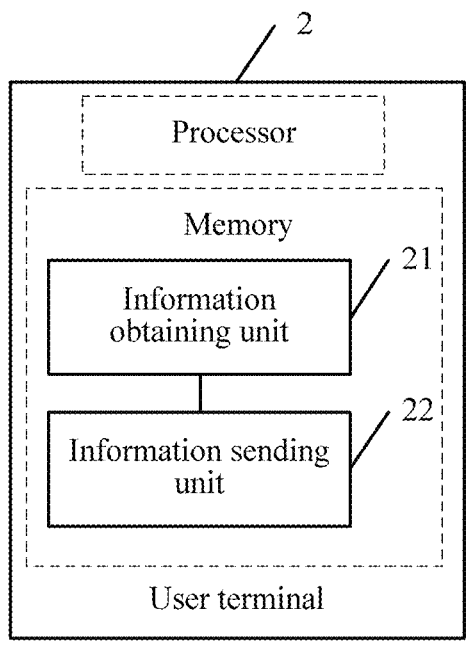
FIG. 17 is a schematic structural diagram of another user terminal according to an embodiment of this application.
Figure 18:
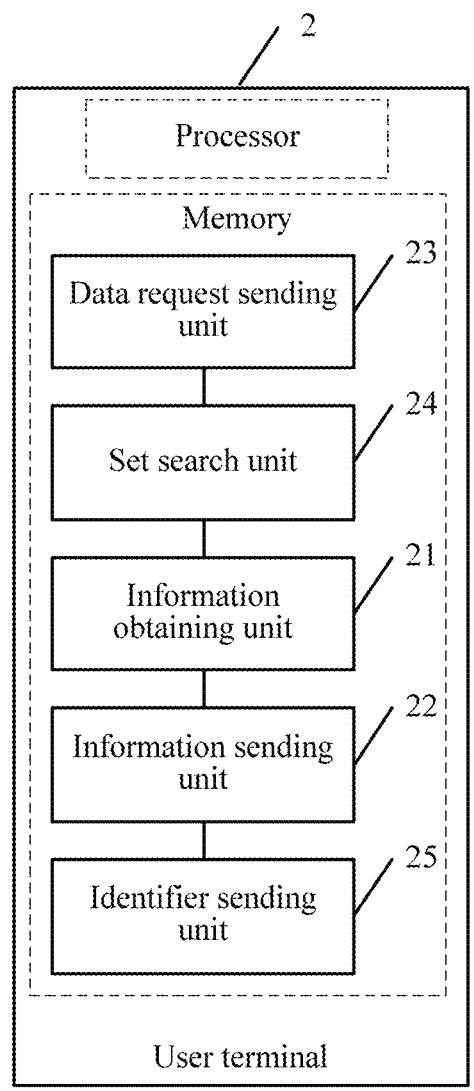
FIG. 18 is a schematic structural diagram of another user terminal according to an embodiment of this application.

The following describes user terminals in embodiments of this application in detail with reference to FIG. 17 and FIG. 18. It should be noted that the user terminals shown in FIG. 17 and FIG. 18 may be specifically the source user terminal in the foregoing embodiments, and are configured to perform the methods in the embodiments shown in FIG. 10 and FIG. 11 of this application. For ease of description, only a part related to this embodiment of this application is shown, and for specific technical details not disclosed, refer to the embodiments shown in FIG. 10 and FIG. 11 of this application.

FIG. 17 is a schematic structural diagram of another user terminal according to an embodiment of this application. As shown in FIG. 17, the user terminal 2 in this embodiment of this application may include: one or more memories; and one or more processors, where the one or more memories store one or more instruction modules, configured to be executed by the one or more processors; and the one or more instruction modules include: an information obtaining unit 21 and an information sending unit 22.

The information obtaining unit 21 is configured to: obtain a target POI identifier selected from a POI identifier set, and obtain interaction information entered for the target POI identifier.

In a specific implementation, the information obtaining unit 21 may obtain the target POI identifier selected from the POI identifier set. Further, the user terminal 2 may obtain, based on the virtual map obtained from the interaction server in advance, the entered location information that needs to be searched for. The user terminal 2 may search for the POI identifier set associated with the location information, and display the POI identifier set. The information obtaining unit 21 may obtain the target POI identifier selected by the user from the POI identifier set, and obtain the interaction information entered for the target POI identifier, for example, red envelope data added for the target POI identifier.

The information sending unit 22 is configured to send the target POI identifier and the interaction information to the interaction server.

In a specific implementation, the information sending unit 22 sends the target POI identifier and the interaction information to the interaction server. The interaction server receives the target POI identifier and the interaction information sent by the user terminal 2, and the interaction server may search for a database corresponding to the target POI identifier, and add the interaction information to the database corresponding to the target POI identifier for storage.

In this embodiment of this application, the corresponding target POI identifier is determined based on the found location information, and the interaction information is displayed. Therefore, a process of setting the POI-related interaction information based on the location information is implemented, POI information is viewed in diversified manners and content displayed by a POI is enriched, and interactivity with the user terminal is improved.

FIG. 18 is a schematic structural diagram of another user terminal according to an embodiment of this application. As shown in FIG. 18, the user terminal 2 in this embodiment of this application may include: one or more memories; and one or more processors, where the one or more memories store one or more instruction modules, configured to be executed by the one or more processors; and the one or more instruction modules include: an information obtaining unit 21, an information sending unit 22, a data request sending unit 23, a set search unit 24, and an identifier sending unit 25.

The data request sending unit 23 is configured to send the data request for the virtual map to the interaction server.

In a specific implementation, when the user terminal 2 detects that the interaction application is triggered to start, for example, a tap operation is performed on an application icon of the interaction application or a slide operation in a fixed direction is detected on an interface of the interaction application, the data request sending unit 23 may send the data request for the virtual map to the interaction server. The interaction server receives the data request sent by the user terminal 2, and sends the virtual map to the user terminal 2.

It may be understood that the interaction server may generate the virtual map by using the plurality of POI identifiers and the map data that are obtained in advance. It may be understood that the map data may include specific distribution data about a road, a greenbelt, a lake, and the like. The plurality of POI identifiers may include distribution identifiers of buildings such as a hotel, a residence, a restaurant, and a toll station. The POI identifiers may be specifically symbols marking POIs on the virtual map. The interaction server performs rendering processing on the plurality of POI identifiers and the map data in a preset rendering manner, to generate the virtual map.

The virtual map may include a virtual map in a first display dimension and a virtual map in a second display dimension. The first display dimension may be a three-dimensional display dimension, and the second display dimension may be a two-dimensional display dimension. The virtual map in the first display dimension may be specifically used to display a current location of the target user terminal, and the virtual map in the second display dimension may be specifically used to search for a POI identifier having a relatively long distance or the like.

The set search unit 24 is configured to: receive the virtual map sent by the interaction server, obtain entered fourth location information, and search, based on the virtual map in the second display dimension, for a POI identifier set related to the fourth location information.

In a specific implementation, the set search unit 24 receives the virtual map sent by the interaction server. In some examples, the set search unit 24 may locally store the virtual map, and when starting the interaction application the next time, may not need to repeatedly obtain the virtual map from the interaction server.

The set search unit 24 may obtain the fourth location information entered by the user, and may search, based on the virtual map in the second display dimension, the POI identifier set associated with the fourth location information. The fourth location information may specifically indicate approximate location information of the target POI identifier for which the interaction information needs to be provided. Referring to FIG. 7, the user terminal 2 may display the virtual map in the two-dimensional display dimension, display a search box, and obtain that the entered fourth location information is the YY road. The YY road may be positioned based on the virtual map in the two-dimensional display dimension, and a POI identifier set, for example, the XX hotel, associated with the YY road may be displayed in a drop-down menu of the search box.

The information obtaining unit 21 is configured to: obtain a target POI identifier selected from a POI identifier set, and obtain interaction information entered for the target POI identifier.

In a specific implementation, the information obtaining unit 21 may obtain the target POI identifier selected from the POI identifier set. For example, in FIG. 7, assuming that the XX hotel is selected from the drop-down menu, a POI identifier of the XX hotel is used as the target POI identifier. The information obtaining unit 21 may obtain the interaction information entered for the target POI identifier, for example, red envelope data added for the target POI identifier.

The information sending unit 22 is configured to send the target POI identifier and the interaction information to the interaction server.

In a specific implementation, the information sending unit 22 sends the target POI identifier and the interaction information to the interaction server. The interaction server receives the target POI identifier and the interaction information sent by the source user terminal 2, and the interaction server may search for a database corresponding to the target POI identifier, and add the interaction information to the database corresponding to the target POI identifier for storage.

The identifier sending unit 25 is configured to: obtain a terminal identifier of the target user terminal selected from a relationship list, and send the terminal identifier to the interaction server.

In a specific implementation, the identifier sending unit 25 may further obtain the terminal identifier of the target user terminal selected from the relationship list. It may be understood that, the relationship list may indicate the terminal identifier of the target user terminal whose interaction relationship is added in advance. The terminal identifier may be an application ID allocated when the interaction application is registered on the target user terminal or may be a communication number or the like registered on the target user terminal. A user of the user terminal 2 may further select an object to which the interaction information is distributed, and the identifier sending unit 25 may obtain the selected terminal identifier and send the terminal identifier to the interaction server.

It may be understood that, the terminal identifier of the target user terminal, the target POI identifier, and the interaction information may be sent to the interaction server together, or the terminal identifier may be first selected and sent and the target POI identifier and the interaction information are then sent. In this embodiment of this application, a sequence of obtaining and sending the terminal identifier is not limited.

The interaction server receives the terminal identifier of the target user terminal that is sent by the user terminal 2, and may further generate the interaction prompt information carrying the target POI identifier, and send the interaction prompt information to the target user terminal corresponding to the terminal identifier. In some examples, the interaction server may further obtain a terminal identifier of the user terminal 2, and encapsulate the terminal identifier of the user terminal 2 to the interaction prompt information. The interaction prompt information is used to prompt the user of the target user terminal that there is obtainable interaction information currently.

In this embodiment of this application, the corresponding target POI identifier is determined based on the found location information, and the interaction information is displayed. Therefore, a process of setting the POI-related interaction information based on the location information is implemented, POI information is viewed in diversified manners and content displayed by a POI is enriched, and interactivity with the user terminal is improved. Requirements of different using environments can be satisfied, and using by the user can be facilitated by using the virtual maps in different dimensions. The terminal identifier of the target user terminal that needs to be notified is selected from the relationship list, so that a process of prompting the interaction information is specifically implemented, and interactivity with the user terminal is further improved.

Figure 19:
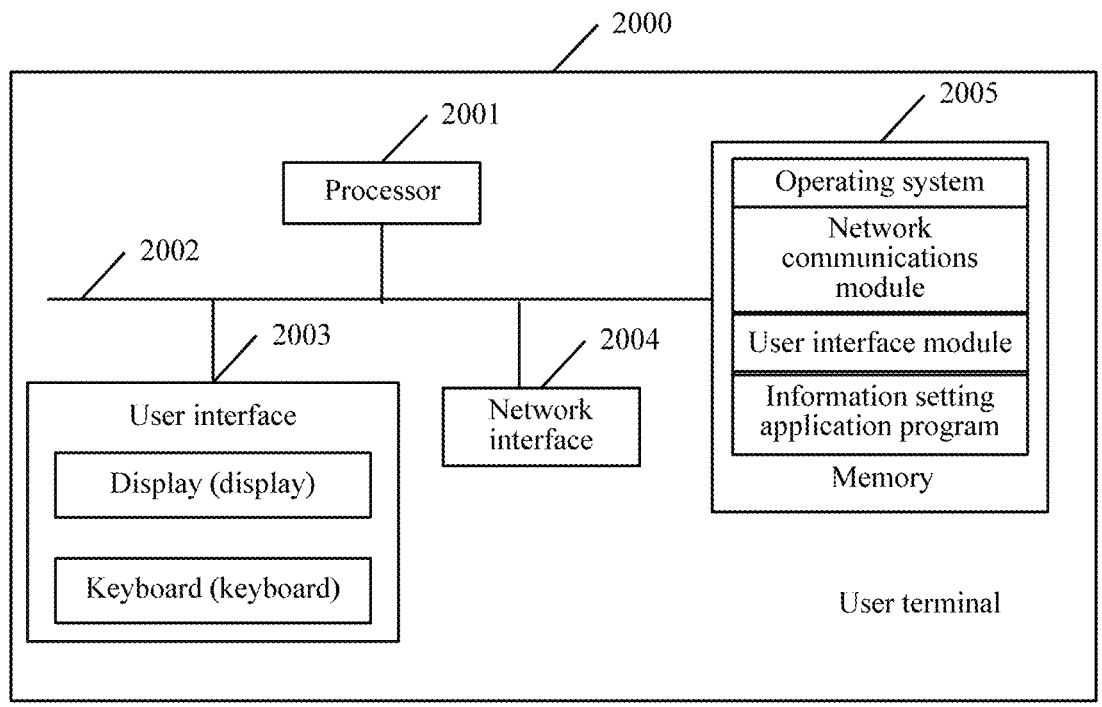
FIG. 19 is a schematic structural diagram of another user terminal according to an embodiment of this application.

FIG. 19 is a schematic structural diagram of another user terminal according to an embodiment of this application. As shown in FIG. 19, the user terminal 2000 may include: at least one processor 2001, for example, a CPU, at least one network interface 2004, a user interface 2003, a memory 2005, and at least one communications bus 2002. The communications bus 2002 is configured to implement connection and communication between these components. The user interface 2003 may include a display, a keyboard, and optionally, the user interface 2003 may further include a standard wired interface and a standard wireless interface. The network interface 2004 optionally may include a standard wired interface and a standard wireless interface (for example, a WI-FI interface). The memory 2005 may be a high-speed RAM memory, or may be a non-volatile memory, for example, at least one magnetic disk storage. Optionally, the memory 2005 may be at least one storage apparatus that is located far away from the foregoing processor 2001. As shown in FIG. 19, the memory 2005 as a computer storage medium may include an operating system, a network communications module, a user interface module, and an information setting application program.

In the user terminal 2000 shown in FIG. 19, the user interface 2003 is mainly configured to: provide an input interface for a user, and obtain data entered by the user. The processor 2001 may be configured to invoke the information setting application program stored in the memory 2005, and specifically performs the operations in the method embodiment performed by the source user terminal in this application.

In this embodiment of this application, the corresponding target POI identifier is determined based on the found location information, and the interaction information is displayed. Therefore, a process of setting the POI-related interaction information based on the location information is implemented, POI information is viewed in diversified manners and content displayed by a POI is enriched, and interactivity with the user terminal is improved. Requirements of different using environments can be satisfied, and using by the user can be facilitated by using the virtual maps in different dimensions. The terminal identifier of the target user terminal that needs to be notified is selected from the relationship list, so that a process of prompting the interaction information is specifically implemented, and interactivity with the user terminal is further improved.

Figure 20:
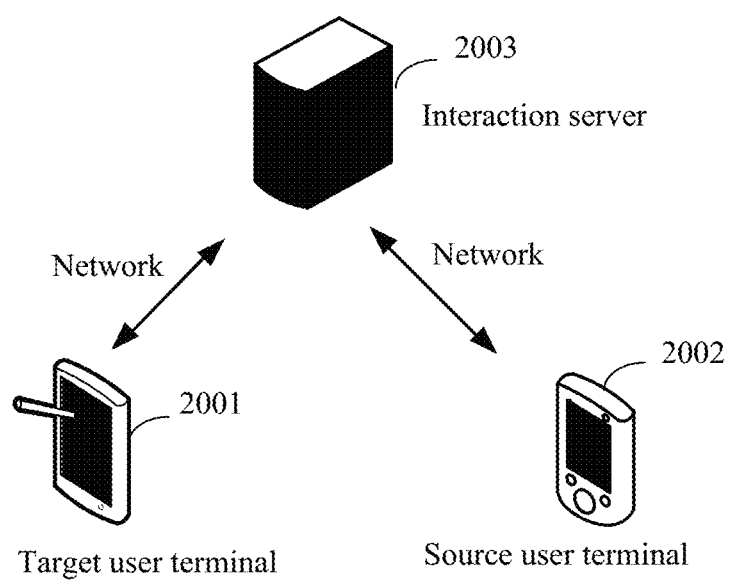
FIG. 20 is a schematic structural diagram of an interaction information obtaining system according to an embodiment of this application.

FIG. 20 is a schematic structural diagram of a network connection system according to an embodiment of this application. As shown in FIG. 20, the system may include: a target user terminal 2001, a source user terminal 2002, and an interaction server 2003. The target user terminal 2001 and the interaction server 2003, and the source user terminal 2002 and the interaction server 2003 both may be connected by using a network. The target user terminal 2001 may be specifically the user terminal 1 in the embodiment shown in any one of FIG. 12 to FIG. 15, and the source user terminal 2002 is specifically the user terminal 2 in the embodiment shown in FIG. 17 or FIG. 18. Alternatively, the target user terminal 2001 may be the user terminal 1000 in the embodiment shown in FIG. 16, and the source user terminal 2002 may be the user terminal 2000 in the embodiment shown in FIG. 19.

The target user terminal 2001 is configured to: when detecting, on a virtual map, a trigger operation performed on a target point of information POI identifier, obtain current first location information based on an interaction application.

The target user terminal 2001 is further configured to: obtain second location information corresponding to the target POI identifier, and detect a distance difference between the first location information and the second location information.

The target user terminal 2001 is further configured to: when the distance difference satisfies a preset distance range, send, to the interaction server 2003, an interaction information request carrying the target POI identifier.

The interaction server 2003 is configured to: receive the interaction information request sent by the target user terminal 2001, obtain the interaction information corresponding to the target POI identifier, and send the interaction information to the target user terminal 2001.

The target user terminal 2001 is further configured to: receive the interaction information sent by the interaction server 2003, and output and display the interaction information.

In an embodiment, the interaction server 2003 is configured to generate the virtual map by using a plurality of POI identifiers and map data that are obtained in advance.

The target user terminal 2001 is configured to: when detecting that the interaction application is triggered to start, send a data request for the virtual map to the interaction server 2003.

The interaction server 2003 is further configured to: receive the data request sent by the target user terminal 2001, and send the virtual map to the target user terminal 2001.

The target user terminal 2001 is further configured to receive the virtual map sent by the interaction server 2003.

The target user terminal 2001 is further configured to: obtain third location information, and output and display the virtual map including the third location information at a preset size.

In an embodiment, the source user terminal 2002 is configured to: obtain the target POI identifier selected from a POI identifier set, and obtain the interaction information entered for the target POI identifier.

The source user terminal 2002 is further configured to send the target POI identifier and the interaction information to the interaction server 2003.

The interaction server 2003 is further configured to: receive the target POI identifier and the interaction information sent by the source user terminal 2002, and store the target POI identifier and the interaction information.

In an embodiment, the source user terminal 2002 is further configured to: obtain a terminal identifier of a target user terminal 2001 selected from a relationship list, and send the terminal identifier to the interaction server 2003.

The interaction server 2003 is further configured to: receive the terminal identifier sent by the source user terminal 2002, generate interaction prompt information carrying the target POI identifier, and send the interaction prompt information to the target user terminal 2001 corresponding to the terminal identifier.

The target user terminal 2001 is further configured to: receive the interaction prompt information sent by the interaction server, and output and display the interaction prompt information.

In an embodiment, the virtual map may include a virtual map in a first display dimension and a virtual map in a second display dimension.

In an embodiment, when being configured to: obtain third location information, and output and display the virtual map including the third location information at a preset size, the target user terminal 2001 is specifically configured to:

obtain third location information, and output and display the virtual map including the third location information in the first display dimension at a first preset size.

In an embodiment, the source user terminal 2002 is further configured to send a data request for the virtual map to the interaction server 2003;

the interaction server 2003 is further configured to: receive the data request sent by the source user terminal 2002, and send the virtual map to the source user terminal 2002;

the source user terminal 2002 is further configured to receive the virtual map sent by the interaction server 2003; and the source user terminal 2002 is further configured to: obtain entered fourth location information, and search, based on the virtual map in a second display dimension, for a POI identifier set related to the fourth location information.

In an embodiment, when being configured to: receive the interaction information sent by the interaction server 2003, and output and display the interaction information, the target user terminal 2001 is specifically configured to:

receive the interaction information sent by the interaction server 2003;

start a camera to obtain a current shot picture, and display an interaction label in the shot picture; and when detecting a trigger operation performed on the interaction label, output and display the interaction information.

In an embodiment, when being configured to: receive the interaction information sent by the interaction server 2003, and output and display the interaction information, the target user terminal 2001 is specifically configured to:

receive the interaction information sent by the interaction server 2003;

encapsulate the interaction information based on a preset encapsulation rule, and generate at least one interaction label after encapsulation; and when detecting a trigger operation performed on a target interaction label that is of the at least one interaction label and that includes the interaction information, output and display the interaction information.

In this embodiment of this application, when the operation is triggered on the target POI identifier on the virtual map, the distance difference between the current first location information of the target user terminal and the second location information corresponding to the target POI identifier is obtained on the virtual map, and when the distance difference satisfies the preset distance range, the interaction information corresponding to the target POI identifier may further be obtained from the interaction server, and is outputted and displayed. This implements a process of obtaining POI-related interaction information based on location information, and improves efficiency of viewing POI-related information. In addition, the interaction information may be self-defined and provided by a source user terminal, POI information is viewed in more diversified manners and content displayed by a POI is enriched, and interactivity with a user terminal is improved. Requirements of different using environments can be satisfied, and using by the user can be facilitated by using the virtual maps in different dimensions. The interaction information is encapsulated in the interaction label, so that interactivity with the user terminal can be further improved.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be a magnetic disk, an optical disc, a read-only memory (ROM) or a random access memory (RAM), or the like.

Therefore, the embodiments of this application further provide a storage medium storing a data processing program, and the data processing program is used to execute any method embodiment of the embodiments of this application.

What is disclosed above is merely preferred embodiments of this application, and certainly is not intended to limit the protection scope of this application. Therefore, equivalent variations made in accordance with the claims of this application shall fall within the scope of this application.

What is claimed is:

1. An interaction information obtaining method performed at a target user terminal having one or more processors and memory storing a plurality of operations to be executed by the one or more processors, the method comprising:
   detecting, by the target user terminal, on a virtual map preset in an interaction application, a trigger operation performed on a target point of information (POI) identifier;
   obtaining, by the target user terminal, first location information of the target user terminal by using the virtual map;
   obtaining, by the target user terminal, second location information corresponding to the target POI identifier on the virtual map, and detecting, by the target user terminal, a distance difference between the first location information and the second location information;
   in accordance with a determination that the distance difference satisfies a preset distance range, sending, by the target user terminal, an interaction information request carrying the target POI identifier to an interaction server, wherein the interaction server, in response to the interaction information request, obtains interaction information corresponding to the target POI identifier and sends the interaction information to the target user terminal; and
   receiving, by the target user terminal, the interaction information sent by the interaction server, and displaying the interaction information on the virtual map.

2. The method according to claim 1, wherein the interaction server generates the virtual map by using a plurality of POI identifiers and map data that are obtained in advance, the method further comprising:
   detecting, by the target user terminal, that the interaction application is triggered to start, and sending, by the target user terminal, a data request for the virtual map to the interaction server, wherein the interaction server receives the data request sent by the target user terminal and sends the virtual map to the target user terminal; and
   obtaining, by the target user terminal, third location information of the target user terminal by using the virtual map, and displaying, by the target user terminal, the virtual map comprising the third location information in the interaction application at a preset size.

3. The method according to claim 2, further comprising:
   obtaining, by a source user terminal, the target POI identifier from a set of the plurality of POI identifiers, and obtaining, by the source user terminal, the interaction information corresponding to the target POI identifier; and
   sending, by the source user terminal, the target POI identifier and the interaction information corresponding to the target POI identifier to the interaction server, wherein the interaction server stores the target POI identifier and the interaction information corresponding to the target POI identifier.

4. The method according to claim 3, further comprising:
   obtaining, by the source user terminal, a terminal identifier of the target user terminal from a relationship list of the interaction application, and sending the terminal identifier to the interaction server, wherein the interaction server generates interaction prompt information carrying the target POI identifier, and sends the interaction prompt information to the target user terminal corresponding to the terminal identifier; and
   receiving, by the target user terminal, the interaction prompt information sent by the interaction server, and outputting and displaying the interaction prompt information.

5. The method according to claim 3, further comprising:
   sending, by the source user terminal, a data request for the virtual map to the interaction server, wherein the interaction server sends the virtual map to the source user terminal; and
   obtaining, by the source user terminal, fourth location information entered by a user, and searching, by the source user terminal, based on the virtual map displayed in a two-dimensional manner, for a POI identifier set related to the fourth location information.

6. The method according to claim 1, wherein the receiving, by the target user terminal, the interaction information sent by the interaction server, and displaying the interaction information on the virtual map comprises:
   receiving, by the target user terminal, the interaction information sent by the interaction server;
   starting, by the target user terminal, a camera to obtain a current shot picture, and displaying, by the target user terminal, in the shot picture, an interaction label encapsulated with the interaction information; and
   in response to a trigger operation performed by a user on the interaction label, outputting and displaying, by the target user terminal, the interaction information.

7. The method according to claim 1, wherein the receiving, by the target user terminal, the interaction information sent by the interaction server, and displaying, by the target user terminal, the interaction information on the virtual map comprises:
   receiving, by the target user terminal, the interaction information sent by the interaction server;
   encapsulating, by the target user terminal, the interaction information based on a preset encapsulation rule, and generating at least one interaction label; and
   in response to a trigger operation performed by a user on a target interaction label that is of the at least one interaction label and that comprises the interaction information, outputting and displaying, by the target user terminal, the interaction information.

8. A target user terminal comprising: one or more processors, memory, and a plurality of machine readable instructions stored in the memory, wherein the plurality of machine readable instructions, when executed by the one or more processors, cause the target user terminal to perform a plurality of operations including:

detecting, by the target user terminal, on a virtual map preset in an interaction application, a trigger operation performed on a target point of information (POI) identifier;

obtaining, by the target user terminal, first location information of the target user terminal by using the virtual map;

obtaining, by the target user terminal, second location information corresponding to the target POI identifier on the virtual map, and detecting, by the target user terminal, a distance difference between the first location information and the second location information;

in accordance with a determination, by the target user terminal, that the distance difference satisfies a preset distance range, sending, by the target user terminal, an interaction information request carrying the target POI identifier to an interaction server, wherein the interaction server, in response to the interaction information request, obtains interaction information corresponding to the target POI identifier and sends the interaction information to the target user terminal; and receiving, by the target user terminal, the interaction information sent by the interaction server, and displaying, by the target user terminal, the interaction information on the virtual map.

9. The target user terminal according to claim 8, wherein the interaction server generates the virtual map by using a plurality of POI identifiers and map data that are obtained in advance, wherein the plurality of operations further include:

detecting, by the target user terminal, that the interaction application is triggered to start, and sending, by the target user terminal, a data request for the virtual map to the interaction server, wherein the interaction server receives the data request sent by the target user terminal and sends the virtual map to the target user terminal; and obtaining, by the target user terminal, third location information of the target user terminal by using the virtual map, and displaying, by the target user terminal, the virtual map comprising the third location information in the interaction application at a preset size.

10. The target user terminal according to claim 8, wherein the receiving, by the target user terminal, the interaction information sent by the interaction server, and displaying, by the target user terminal, the interaction information on the virtual map comprises:

receiving, by the target user terminal, the interaction information sent by the interaction server;

starting, by the target user terminal, a camera to obtain a current shot picture, and displaying, by the target user terminal, in the shot picture, an interaction label encapsulated with the interaction information; and in response to a trigger operation performed by a user on the interaction label, outputting and displaying, by the target user terminal, the interaction information.

11. The target user terminal according to claim 8, wherein the receiving, by the target user terminal, the interaction information sent by the interaction server, and displaying, by the target user terminal, the interaction information on the virtual map comprises:

receiving, by the target user terminal, the interaction information sent by the interaction server;

encapsulating, by the target user terminal, the interaction information based on a preset encapsulation rule, and generating, by the target user terminal, at least one interaction label; and in response to a trigger operation performed by a user on a target interaction label that is of the at least one interaction label and that comprises the interaction information, outputting and displaying, by the target user terminal, the interaction information.

12. A non-transitory computer readable storage medium storing a plurality of machine readable instructions in connection with a target user terminal having one or more processors, wherein the plurality of machine readable instructions, when executed by the one or more processors, cause the target user terminal to perform a plurality of operations including:

detecting, by the target user terminal, on a virtual map preset in an interaction application, a trigger operation performed on a target point of information (POI) identifier;

obtaining, by the target user terminal, first location information of the target user terminal by using the virtual map;

obtaining, by the target user terminal, second location information corresponding to the target POI identifier on the virtual map, and detecting, by the target user terminal, a distance difference between the first location information and the second location information;

in accordance with a determination that the distance difference satisfies a preset distance range, sending, by the target user terminal, an interaction information request carrying the target POI identifier to an interaction server, wherein the interaction server, in response to the interaction information request, obtains interaction information corresponding to the target POI identifier and sends the interaction information to the target user terminal; and receiving, by the target user terminal, the interaction information sent by the interaction server, and displaying, by the target user terminal, the interaction information on the virtual map.

13. The non-transitory computer readable storage medium according to claim 12, wherein the interaction server generates the virtual map by using a plurality of POI identifiers and map data that are obtained in advance, wherein the plurality of operations further include:

detecting, by the target user terminal, that the interaction application is triggered to start, and sending, by the target user terminal, a data request for the virtual map to the interaction server, wherein the interaction server receives the data request sent by the target user terminal and sends the virtual map to the target user terminal; and obtaining, by the target user terminal, third location information of the target user terminal by using the virtual map, and displaying, by the target user terminal, the virtual map comprising the third location information in the interaction application at a preset size.

14. The non-transitory computer readable storage medium according to claim 12, wherein the receiving, by the target user terminal, the interaction information sent by the interaction server, and displaying, by the target user terminal, the interaction information on the virtual map comprises:

receiving, by the target user terminal, the interaction information sent by the interaction server;

starting, by the target user terminal, a camera to obtain a current shot picture, and displaying, by the target user terminal, in the shot picture, an interaction label encapsulated with the interaction information; and in response to a trigger operation performed by a user on the interaction label, outputting and displaying, by the target user terminal, the interaction information.

15. The non-transitory computer readable storage medium according to claim 12, wherein the receiving, by the target user terminal, the interaction information sent by the interaction server, and displaying, by the target user terminal, the interaction information on the virtual map comprises:

receiving, by the target user terminal, the interaction information sent by the interaction server;

encapsulating, by the target user terminal, the interaction information based on a preset encapsulation rule, and generating, by the target user terminal, at least one interaction label; and in response to a trigger operation performed by a user on a target interaction label that is of the at least one interaction label and that comprises the interaction information, outputting and displaying, by the target user terminal, the interaction information.

* * * * *